(12) United States Patent
Edelmann et al.

(10) Patent No.: US 12,546,814 B2
(45) Date of Patent: Feb. 10, 2026

(54) CONTROL OF AN AUTOMATED TEST EQUIPMENT BASED ON TEMPERATURE

(71) Applicant: Advantest Corporation, Tokyo (JP)

(72) Inventors: Jens Edelmann, Baldham (DE); Anton Thoma, Munich (DE)

(73) Assignee: ADVANTEST CORPORATION, Tokyo (JP)

( * ) Notice: Subject to any disclaimer, the term of this patent is extended or adjusted under 35 U.S.C. 154(b) by 213 days.

(21) Appl. No.: 18/330,781

(22) Filed: Jun. 7, 2023

(65) Prior Publication Data
US 2023/0384361 A1    Nov. 30, 2023

Related U.S. Application Data

(63) Continuation of application No. PCT/EP2021/077031, filed on Sep. 30, 2021.

(51) Int. Cl.
*G01R 31/28* (2006.01)

(52) U.S. Cl.
CPC ....... *G01R 31/2834* (2013.01); *G01R 31/287* (2013.01); *G01R 31/2874* (2013.01)

(58) Field of Classification Search
None
See application file for complete search history.

(56) References Cited

U.S. PATENT DOCUMENTS

| 9,638,718 B2* | 5/2017 | Haefner | G01R 31/2834 |
| 11,808,813 B2* | 11/2023 | Deshmane | G01R 31/31721 |
| 2002/0196037 A1 | 12/2002 | Byrd | |
| 2006/0164111 A1 | 7/2006 | Lopez et al. | |
| 2012/0212246 A1* | 8/2012 | Benjamin | G01R 31/2874 324/750.03 |
| 2016/0109485 A1 | 4/2016 | Haefner et al. | |

(Continued)

FOREIGN PATENT DOCUMENTS

| CN | 103018500 A | 4/2013 |
| CN | 112272762 A | 1/2021 |

(Continued)

OTHER PUBLICATIONS

First Office Action received for Chinese Application No. 202180017675.5 dated Sep. 16, 2025, 26 pages.

*Primary Examiner* — Jermele M Hollington
(74) *Attorney, Agent, or Firm* — Squire Patton Boggs LLP; Sarah Mirza

(57) ABSTRACT

Embodiments according to the disclosure comprise a control device for controlling an ATE for testing a DUT which is electrically coupled to the ATE using, or for example via, a device under test (DUT) contacting structure, e.g. using or via a probe needle, or for example using or via a DUT socket. The control device is configured to figure out a temperature of the DUT contacting structure using a thermal model, e.g. using a thermal model of the DUT contacting structure or using, for example, a thermal model comprising a thermal model of the DUT contacting structure. In addition, the control device is configured to influence, e.g. to control, to regulate, to deactivate and/or to limit, a signal applied to the DUT contacting structure based on the figured out, or for example modeled, temperature. The figured out temperature comprises at least one of a determined temperature or an estimated temperature.

34 Claims, 8 Drawing Sheets

(56) References Cited

U.S. PATENT DOCUMENTS

2019/0086468 A1 3/2019 Yoshino et al.
2019/0101587 A1 4/2019 Watanabe

FOREIGN PATENT DOCUMENTS

| JP | 2012-256799 A | 12/2012 |
| KR | 20070114310 A | 11/2007 |
| KR | 20150048730 A | 5/2015 |

* cited by examiner

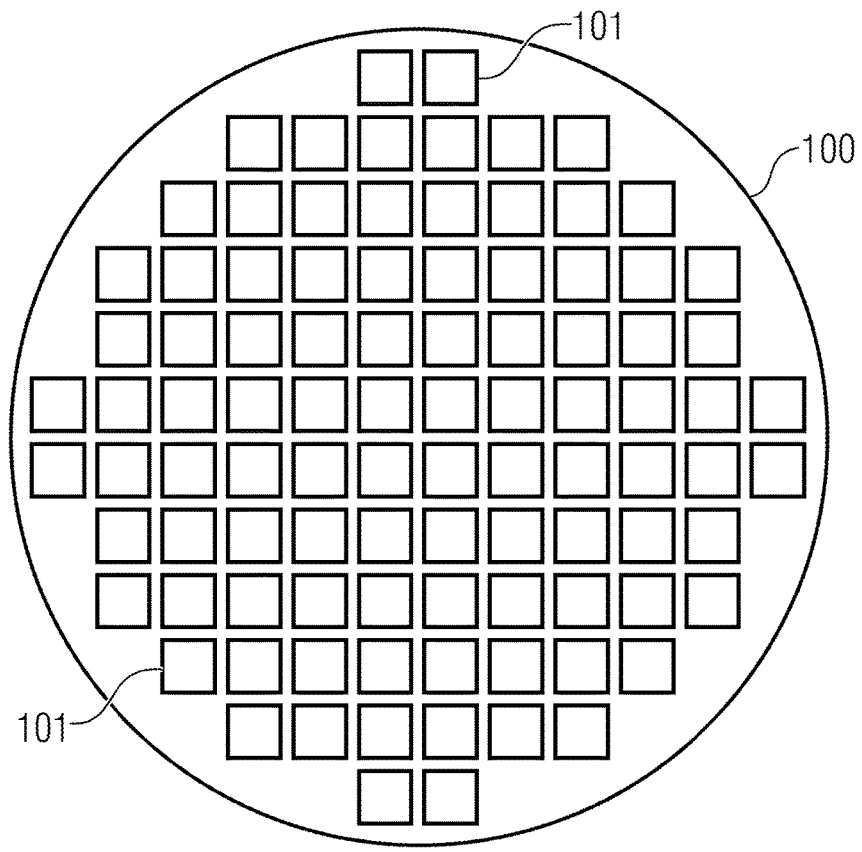
Fig. 1A
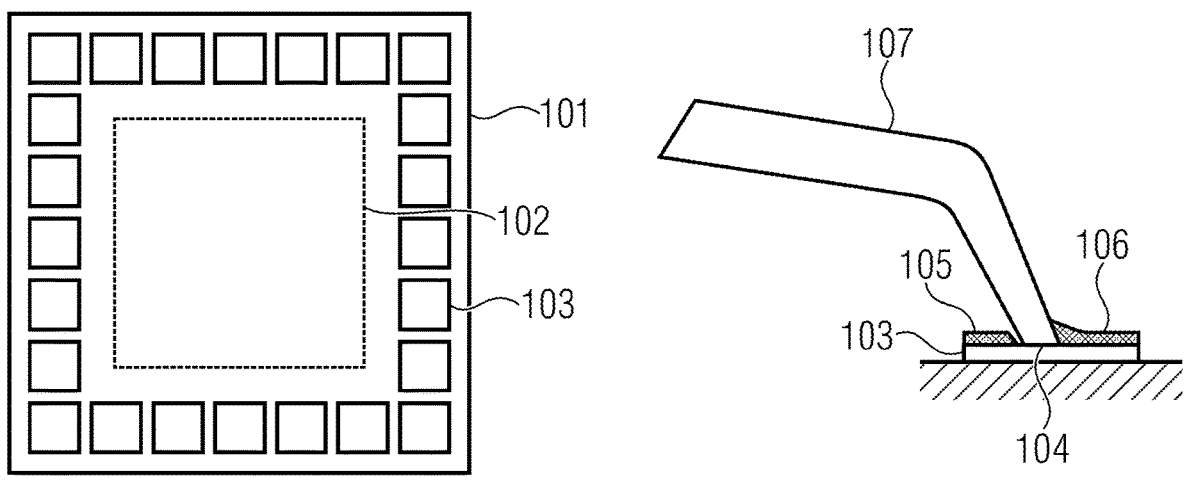
Fig. 1B
Fig. 1C

CONTROL OF AN AUTOMATED TEST EQUIPMENT BASED ON TEMPERATURE

CROSS-REFERENCE TO RELATED APPLICATION

This application is a continuation of copending International Application No. PCT/EP2021/077031, filed Sep. 30, 2021, which is incorporated herein by reference in its entirety.

TECHNICAL FIELD

Embodiments according to the disclosure are related to control devices for controlling an automated test equipment (ATE), methods for controlling an ATE, methods for operating an ATE, and computer programs for performing such methods based on a temperature, where the temperature is estimated or determined.

Further embodiments according to the disclosure are related to probe needle safeguards.

BACKGROUND OF THE DISCLOSURE

For a better understanding of the disclosure, problems addressed with embodiments of the disclosure are motivated, inter alia, with regard to prior solutions.

Quality assurance during semiconductor production is achieved by integrated circuit (IC) testing. Every IC needs to be tested against its specification in order to guarantee its quality.

Automated test equipment (ATE) is used to provide power supply and stimulus to the device under test (DUT) and to measure signals that get compared against expectations.

FIGS. 1A, 1B, and 1C show a schematic view of an IC wafer-level testing setup for testing of devices under test. FIG. 1A shows a wafer with a plurality of devices under test, as an example, bare dies 101. FIG. 1B shows, as an example, one of the bare dies 101, comprising DUT circuitry 102, surrounded by metal contact pads 103. FIG. 1C shows, as an example, a probe needle 107, contacting one of the metal contact pads 103 through a pierced oxide layer 105 of the bare die 101 shown in FIG. 1B.

IC wafer-level 100 testing is applied for quality assurance of unpackaged devices (like bare die 101) or to identify defects during wafer sort to avoid unnecessary packaging cost.

A reliable electrical contact between test system and DUT circuitry 102 may, for example, be essential.

The DUT provides metal contact pads 103 which are connected via probe needles 107 to the test system.

The probe needle 107 consists of metal to conduct current to the DUT. An IC 101 usually has hundreds of contact pads 103 (here simplified illustration) to be connected simultaneously for test, resulting in tiny mechanical dimensions of probe needles. Thus, probe needles may, for example, be delicate error-prone.

Proper signal transfer from the test system to the DUT 101 may demand a reasonable connection via probe needle 107 and DUT pad 103. The probe needle tip may scrub and scratch the metal surface 106 of the die pad 103 to get a solid contact, which may create wearing of the probe needle tip thru oxidation, mechanical abrasion and contamination of pad residual 106. Increased temperature during test may accelerate the wearing process. Die temperature may be a specified test parameter; self-heating due to current flow creates further stress to the probe contact 104. To mitigate those stress factors, probe needles may undergo cleaning cycles to remove contamination at probe tips and to recover mechanical parameters, e.g., as much as possible. Growing stress, mechanical in combination with thermal stress, of the probe needle may eventually lead to irreversible degradation, e.g., caused by negative change of electrical or mechanical probe needle parameters (abrasion, reduced spring tension, melting).

Derating may be a common approach to mitigate overheating of probe needles under stress situations. Therefore, the applied current per probe needle may be supposed to stay below (e.g., mostly significantly below) its rated maximum current rating. However, even using derating, probe needle "burn" may still be observed, e.g., most probably due to a combination of weak contact quality from the probe needle tip to the die pad and over current situations. Increased probe needle temperature may lead to increased power thru increased resistance which may ultimately end up in thermal runaway.

Summed up, a problem of the prior art is that thermal stress to probe needles may lead to overheating and irreversible degradation and damage such as reduced spring tension or tip melting. This may lead to disrupted IC production. The probe card may require expensive and time consuming repair, or even total loss of probe card, with potential further down time of IC production may be possible.

Therefore, it is desired to get a concept which allows to diminish, or even avoid, degradation and/or damage on contacting elements used for device testing. In addition, it is desired that such a concept provides a better compromise between system complexity, implementation effort and an effectiveness of damage mitigation.

This is achieved by the subject matter of the independent claims of the present application.

Further embodiments according to the disclosure are defined by the subject matter of the dependent claims of the present application.

SUMMARY OF THE DISCLOSURE

Embodiments according to the disclosure comprise a control device for controlling an automated test equipment (ATE) for testing a device under test (DUT) which is electrically coupled to the automated test equipment using, or for example via, a device under test contacting structure, e.g., using or via a probe needle, or for example using or via a DUT socket. The control device is configured to figure out a temperature of the DUT contacting structure using a thermal model, e.g., using a thermal model of the DUT contacting structure or using, for example, a thermal model comprising a thermal model of the DUT contacting structure. In addition, the control device is configured to influence, e.g., to control, to regulate, to deactivate and/or to limit, a signal applied to the DUT contacting structure based on the figured out, or for example modeled, temperature, wherein the figured out temperature comprises at least one of a determined temperature or an estimated temperature.

Embodiments according to the disclosure are based on the idea to figure out a temperature of a DUT contacting structure using a thermal model, in order to influence a signal applied to the DUT contacting structure.

In a testing scenario, a DUT may be provided with a, for example predetermined, test signal. This may, for example, be a DUT target voltage or a DUT target current. Since the DUT should for example be attached to and removed from the testing setup, for example a test head of an automated test equipment, easily, contacting structures, such as probe needles or other elements configured to provide an electrical contact to the DUT may be used. As explained before, theses DUT contacting structures may be subject to wear, especially thermally induced wear.

The inventors recognized that wear and other contacting structure damages may be avoided or mitigated, if the temperature of the DUT contacting structure is kept below a certain threshold. One challenge may be to track this temperature during test, wherein test signals may be changed or adapted in quick succession. In addition, in some cases, it may be difficult to gather precise knowledge about the contacting surface between DUT contacting structure and the DUT or a DUT contact, e.g., a bond pad or a contact pad of the DUT. Bad contacts may lead to increased thermal load on the DUT contacting structure and therefore temperatures and therefore damage.

Hence, the inventors recognized that a tracking of the temperature of the DUT contacting structure may be performed using a thermal model, for example comprising a thermal model of the DUT contacting structure. This may allow to keep the temperature of the DUT contacting structure within unproblematic temperature boundaries. Tracking of the temperature may, for example, be performed in real time. For example, in contrast to temperature measurements, a figured out (an estimated or determined) temperature may be provided much faster. It may even be possible to predict temperature developments, allowing to adapt testing and/or signal provision for the DUT.

In any way, in order to influence the temperature of the DUT contacting structure, a signal applied to the DUT contacting structure, for example the signal provided for the DUT, or a signal comprising a signal for the DUT, e.g., the test signal, may be influenced based on the temperature figured out using the thermal model, wherein the temperature figured out comprises at least one of a determined temperature or an estimated temperature. The influencing may, for example, comprise a controlling or regulating, or deactivating, or cutting off, or limiting of the signal, e.g., of a current.

Consequently, degradation and/or damage on contacting elements may be diminished, or even avoided. In other words, probe needle overheating and irreversible degradation and damage may be diminished or even avoided. Damage may be mitigated effectively and, in order to do so, additional temperature measurements at the DUT contacting structure may be omitted, such that, for example, only existing current and voltage measurements, and/or only few additional voltage and/or current measurements may be used in order to allow for the, e.g., real time, tracking of the temperature. Therefore, the inventive concept may be implemented with low effort and low impact on system complexity.

Furthermore, other problems solved by embodiments of the disclosure may be that thermal stress to probe needles may lead to overheating and irreversible degradation and damage such as reduced spring tension or tip melting. This may lead to disrupted IC production. The probe card may require expensive and time consuming repair, or even total loss of probe card, with potential further down time of IC production. These problems may be overcome by, or using, embodiments of the disclosure.

According to further embodiments of the disclosure, the thermal model comprises a thermal model of the DUT contacting structure, which may, for example, consider a heat capacity of the DUT contacting structure, a heat conduction of DUT conducting structure, and optionally also a thermal characteristics of a thermal environment of the DUT contacting structure and/or radiation characteristics. Alternatively, or in addition, the thermal model comprises a thermal model of a DUT contact, e.g., DUT contact pad and/or for example a DUT bond pad, which is used for electrically coupling the DUT to the automated test equipment, and which may, for example, consider a heat capacity of the DUT contact, a heat conduction of DUT contact, and optionally also thermal characteristics of a thermal environment of the DUT contact and/or radiation characteristics. Alternatively, or in addition, the thermal model jointly models the DUT contacting structure and the DUT contact.

In addition to an information, e.g., a thermal model information on the DUT contacting structure, the thermal model may also comprise an information about a DUT contact. In simple words, the DUT contacting structure may, for example, be a first part of a contacting arrangement between ATE and DUT on the ATE-side and the DUT contact may, for example, be a second part of the contacting arrangement between ATE and DUT on the DUT-side.

As explained before, the DUT contacting structure may, for example, be a probe needle, and the DUT contact may, for example, be a DUT contact pad. Hence, a whole contacting arrangement may comprise the needle and the pad. The thermal model may be used to describe any or all parts of such a contacting arrangement, therefore comprising thermal models of the DUT contacting structure and/or contact or a mix thereof, e.g., a model that may not be distinctively dissected in a first portion describing the DUT contacting structure and a second portion describing the contact. The thermal model may especially include a contacting surface between contacting structure and contact, e.g., as a part of the contact, or modeled in a different manner.

Therefore, the thermal model may be constructed according to the requirements of the specific application, e.g., with regard to available computation power and/or modelling accuracy. This allows for an additional degree of freedom and allows figure out the temperature of the DUT contacting structure with high accuracy.

According to further embodiments of the disclosure, the thermal model comprises a model parametrization, wherein the model parametrization is configured to represent a thermal behavior of the DUT contacting structure. In addition, the control device is configured to adapt the model parametrization, based on measurements of a current of the signal applied to the DUT contacting structure and/or based on measurements of a voltage of the DUT contacting structure, in order to additionally represent a thermal behavior of an interface of the DUT contacting structure and a DUT contact, which is used for electrically coupling the DUT to the automated test equipment, with the thermal model, and/or in order to additionally represent a thermal behavior of the DUT contact with the thermal model, in order figure out a temperature of the DUT contacting structure.

The model may comprise a default-parametrization that may be adapted according to the specific characteristics of the hardware of the application. As an example, a parameter describing a resistance of a probe needle may be adapted with a term taking the contact pad of the DUT in consideration, e.g., an additional resistance. Such parameter adaptions may be performed at runtime, e.g., in real time, for example based on measurements. Hence, the thermal model may be an adaptive model, allowing for a good accuracy with regard to temperature estimates.

According to further embodiments of the disclosure, the control device is configured to determine or to estimate the temperature of the DUT contacting structure using a current measurement, for example of the signal applied to the DUT contacting structure and using the thermal model and using a measurement of a potential difference, e.g. a voltage, which is equal to a potential difference, e.g. a voltage, over the DUT contacting structure, or which includes a potential difference, e.g. a voltage, over the DUT contacting structure, or for example, which approximates a potential difference across the DUT contacting structure, or for example, which represents a potential difference across the DUT contacting structure; or which represents a voltage drop between an ATE-sided end of the DUT contacting structure and a contact pad of the DUT, or which represents a voltage drop between an ATE-sided end of the DUT contacting structure and a DUT contact, which is used for electrically coupling the DUT to the automated test equipment, or which represents a voltage drop at a transition to the DUT including the DUT contacting structure.

According to embodiments, a plurality of optional measurements may be used in order to simulate or evaluate the thermal model. Hence, an inventive concept may be adapted easily to a specific hardware setup, e.g., comprising only limited options for the measurements of voltages.

According to further embodiments of the disclosure, the control device is configured to figure out the temperature of the DUT contacting structure using the thermal model and using a voltage measurement which describes a voltage drop across the DUT contacting structure or across a transition, e.g. from the automated test equipment or from a load board, towards the device under test which includes the DUT contacting structure, and for example a DUT contact and optionally some wiring within the device under test, and using a current measurement which describes, at least approximately, a current flowing through the DUT contacting structure.

With, for example a measurement of, the voltage drop across the DUT contacting structure or across a corresponding transition from ATE to DUT, as a part of the thermal model, together with an information about the current flowing through said structure or transition a power or energy that may cause a change of temperature may be determined. With knowledge of such voltages and currents and hence power and/or energy, the temperature of the DUT contacting structure may be evaluated or determined precisely.

According to further embodiments of the disclosure, the control device is configured to determine, e.g. measure, or compute from two separate voltage measurements, a voltage between (=potential difference between) an ATE-sided end of the DUT contacting structure and a DUT contact of the DUT, which may, for example, be equal to the DUT contact contacted by the DUT contacting structure or which may be conductively coupled with the DUT contact contacted by the DUT contacting structure, e.g. to be on a substantially same potential like the DUT contact contacted by the DUT contacting structure. Furthermore, the control device is configured to use the determined voltage to figure out the temperature of the DUT contacting structure using the thermal model.

In practical applications, it may be difficult to measure a voltage drop over the DUT contacting structure precisely. On the other hand, it may be sufficient to measure a voltage between an ATE-sided end of the DUT contacting structure and a DUT contact of the DUT, in order to provide enough information for the thermal model to describe a temperature change in the DUT contacting structure effectively. This may allow for a simplified measurement of a voltage of the DUT contacting structure.

According to further embodiments of the disclosure, the control device is configured to determine, e.g., to measure or to compute, a current provided by an ATE port, e.g., an output of a device power supply, or an output of an analog or digital ATE channel module, coupled with the DUT contacting structure, or a current flowing through the DUT contacting structure, and to use the determined current to figure out the temperature of the DUT contacting structure using the thermal model.

Many ATE systems may provide internal functionality in order to measure or to set a current provided with a port. Hence, an inventive concept may be applied with limited additional effort. Furthermore, the current of the ATE port may, for example, be approximately the signal applied to the DUT contacting structure. Moreover, the signal, e.g., current, applied to the DUT contacting structure may be determined based on the determined current, e.g., subtracting sub-currents that are provided or conducted away to other circuitry. Hence, knowledge of the current provided by the ATE port or even of the current flowing through the DUT contacting structure may allow for a precise estimation or determination of the temperature of the DUT contacting structure, for example based on a determination of a power or energy (e.g., in combination with a voltage measurement, such as the voltage measurements explained before).

According to further embodiments of the disclosure, the control device is configured to measure, or to receive a measurement of, a current provided by an ATE port, e.g., by an output of a device power supply, or by an output of an analog or digital ATE channel module, coupled with the DUT contacting structure. Furthermore, the control device is configured to determine, e.g., to compute, a current flowing through one or more capacitors coupled with the ATE port, e.g., using the relation $iC=C\,du/dt$. Moreover, the control device is configured to derive, e.g., to compute, a current flowing through the DUT contacting structure using the measured current and using the determined current flowing through one or more capacitors coupled with the ATE port, e.g., by subtracting the current flowing through the one or more capacitors from the measured current.

In general, the influence of other circuitry in the ATE that may influence the signal applied to the DUT contacting structure may be compensated, for example at least partially. For a power supply, e.g., an ATE port providing a current, a capacitor may be implemented to stabilize the output signal of the ATE port. Hence, an influence, e.g., a current flowing through said capacitor, may be compensated, e.g., subtracted from an output current of the ATE port, in order to determine the current provided to the DUT contacting structure. Consequently, the temperature of the DUT contacting structure may be figured out with good accuracy, while also being able to use additional circuitry for the test optimization, e.g., in the form of a, e.g., decoupling capacitor temperature, wherein the figured out temperature comprises at least one of a determined temperature or an estimated temperature.

According to further embodiments of the disclosure, the control device is configured to figure out the temperature of the DUT contacting structure using at least one of an environmental temperature, e.g. an air temperature or a temperature of a load board on which the DUT contacting structure is mounted, a wafer temperature, e.g. of the DUT, a die temperature, e.g. of the DUT, a current carrying capability of the DUT contacting structure, a heat conduction value of the DUT contacting structure, a heat convections value of the structure and/or a duration, for example a duration during which the signal is applied to the DUT contacting structure.

A plurality of parameters may be considered in order to improve the accuracy of the temperature estimation or determination. Based on the specific test setup, or ATE, parameters available may be incorporated in the thermal model.

According to further embodiments of the disclosure, the environmental temperature and/or the wafer temperature and/or the die temperature is a respective measured temperature or a respective set point temperature.

These temperatures do not necessarily have to be measured to be incorporated in the model. Hence, a consideration of these parameters may be possible using set point values. Thus, accuracy of the temperature estimation or determination may be increased, or even increased with low additional effort.

According to further embodiments of the disclosure, the control device is configured to determine or to estimate a temporal evolution of a temperature of the DUT contacting structure using the thermal model.

The temporal evolution may even comprise a future temperature course, or in other words a temperature prediction. Furthermore, the temporal evolution of the temperature may be used in order to decide or to predict when a test may have to be stopped due to imminent contacting structure damage. Hence, determination and or estimation of the temporal evolution allows for an extraction of additional test information.

According to further embodiments of the disclosure, the control device is configured to figure out the temperature of the DUT contacting structure using a temporal resolution of at most $1/100$ of a thermal time constant of the DUT contacting structure.

The temporal resolution may, for example, be chosen with respect to a volatility of a predetermined test signal. This way, it may be probable that an overheating may be detected fast enough in order to avoid damage. On the other hand, the temporal resolution mays be chosen according to the time constant of the DUT contacting structure and/or DUT contact and/or a combination thereof. As an example, resolution should be shorter than $1/100$th of thermal time constant of PN, e.g., probe needle, e.g., 10 ms time constant of PN requires temporal resolution of less than 0.1 msec.

According to further embodiments of the disclosure, the control device is configured to control or to deactivate the signal applied to the DUT contacting structure based on the figured out temperature, wherein the figured out temperature comprises at least one of a determined temperature or an estimated temperature.

Via a deactivation or control of the signal, an elevated temperature of the DUT contacting structure may be reduced until it is below a critical limit or the temperature of the DUT contacting structure may be reduced before it reaches a critical limit. Therefore, contacting structure damage may be avoided.

According to further embodiments of the disclosure, the control device is configured to deactivate the signal applied to the DUT contacting structure within a time of less or equal than two times a temporal resolution of the control device.

With knowledge of the figure out (estimated or determined) temperature, for example in real time, controlling or deactivating the signal may be performed in real time or for example at run time, e.g., within time constants of thermal processes of the DUT contacting structure, taking in consideration the signal applied to the DUT contacting structure, such that overheating may be avoided. As an example, reaction time should be less or equal than 2 times the temporal resolution, e.g., for 0.1 msec temporal resolution the deactivation time shall be less than 0.2 msec.

According to further embodiments of the disclosure, a signal applied to the DUT contacting structure, e.g., by the ATE, is a at least one of a test-signal, e.g., a test-stimulus, and/or a power supply signal, e.g., a current.

The test-signal or test-stimulus may be configured to put the DUT in predetermined states, for example in order to test the behavior of the DUT. The signal or stimulus may be adapted to generate a predetermined voltage or potential at the DUT. Using the inventive temperature estimation or determination e.g., as explained before, the test-signal may be chosen according to the test performed, for example without taking over heating problems of the conducting structure specifically into consideration, since the inventive concept may allow to monitor the conducting structure.

According to further embodiments of the disclosure, the DUT contacting structure comprises, or for example is, a probe needle and/or a conductor of a DUT socket, e.g., of a DUT test socket.

Any contacting element configured to provide an electrical connection between ATE and DUT may be monitored or supervised via the inventive temperature estimation or determination.

According to further embodiments of the disclosure, wherein the control device is configured to reduce or to switch off, or for example to cut off, or to limit a current applied to the DUT contacting structure in response to a detection that the figured out temperature of the DUT contacting structure exceeds a threshold, in order to prevent damage on the DUT contacting structure, wherein the figured out temperature comprises at least one of a determined temperature or an estimated temperature.

The current may, for example be a feeding current of the DUT. One portion of such a feeding current may, for example, be the signal applied to the DUT (another portion may, for example, be conducted to other circuitry such as a decoupling capacitor). According to embodiments, the current may be switched off or cut off, for example reducing the current to 0 A, or only limited, for example reduced, to a value that may allow the conducting structure to cool below a certain threshold. Hence, the conducting structure may be protected effectively.

According to further embodiments of the disclosure, the control device is configured to determine a heating power, heating the modeled DUT contacting structure, using a formation of a product, a first factor of which is equal to, or based on, a measured voltage, and a second factor of which is equal to, or based on, a measured current.

This may allow figure out the temperature of the conductive structure precisely.

According to further embodiments of the disclosure, the control device is configured figure out a temperature of a DUT contact, which is used for electrically coupling the DUT to the automated test equipment, using a thermal model, e.g., using a thermal model of the DUT contact or using a thermal model comprising a thermal model of the DUT contact. Furthermore, the control device is configured to influence, e.g., to control, to regulate, to deactivate, and/or to limit, the signal applied to the DUT contact structure based on the figured out, e.g., modeled, temperature of the DUT contact and based on the figured out temperature of the DUT contact structure, wherein the figured out temperature comprises at least one of a determined temperature or an estimated temperature.

In addition to an estimation of a temperature of a DUT contacting structure, which may be a temperature of an element of the connection between ATE and DUT from the ATE side, a temperature of a DUT contact, e.g., a DUT bond pad or contact pad, which may be a temperature of an element of the connection between ATE and DUT from the DUT side, may be figure out (estimated or determined) and hence the signal applied to the DUT contacting structure adapted based thereon. These temperatures may, for example, be equal or at least approximately equal.

As an example, the DUT contacting structure may be a probe needle, providing a connection from the ATE or an ATE port providing a current to the DUT, via the DUT contact, being as an example a contact pad. Needle and pad may form a contacting arrangement that provides an electrical contact between ATE and DUT. Critical thermal behavior may occur, as an example, in between these two elements. In addition, temperatures of needle and pad may be related strongly. Hence, the temperatures of both may be estimated. This may as well comprise an estimation or determination of a temperature of an interface between the two elements, in general between DUT contacting structure and DUT contact, e.g., a contact surface between probe needle and contact pad.

This may allow for an effective damage mitigation or damage avoidance. It is also to be noted that damage or wear may also be reduced or avoided on the DUT contact, e.g., the contact pad. Remains of melted probe needles may, for example, influence the quality of the contact pad.

Further embodiments according to the disclosure comprise an automated test equipment (ATE), comprising a control device comprising any of the herein explained functionalities and/or features individually or taken in combination, and an ATE resource, e.g., a device power supply or a digital channel module or an analog channel module, configured to provide the signal applied to the DUT contacting structure. In addition, the control device is configured to influence the ATE resource in order to influence the signal applied to the DUT contacting structure based on the figured out temperature, wherein the figured out temperature comprises at least one of a determined temperature or an estimated temperature.

The control device may, for example, be a source regulation unit configured to regulate or control the ATE resource. According to other embodiments, the control device may, for example, be an additional device, configured to influence a source regulation unit, hence influencing the ATE resource using or via the source regulation unit. The ATE resource may, for example, provide a current comprising the signal applied to the DUT contacting structure. The control device being configured to influence the ATE resource may provide a simple and effective possibility to incorporate the inventive concept in existing ATE systems, with low additional complexity.

According to further embodiments of the disclosure, the automated test equipment comprises a first measurement unit configured to measure a current of the signal applied to the DUT contacting structure and a second measurement unit configured to measure a voltage between (e.g., a potential difference) between, an ATE-sided end of the DUT contacting structure and a DUT contact of the DUT. Furthermore, the first and the second measurement unit are configured to provide the respective measurement of the measured voltage and the measurement of the current of the signal applied to the DUT contacting structure to the control device, in order to allow for a determination or to allow for an estimation of the temperature of the DUT contacting structure.

The current may, for example, be a feeding current provided by an ATE port. The current may, for example, comprise the signal, e.g., current, applied to the DUT contacting structure. However, other circuitry of the ATE, e.g., a decoupling capacitor may, for example, use or dissipate another portion of the current provided by the ATE port. Optionally, the current may, for example be the signal applied to the DUT contacting structure.

As an example, the second measurement unit may comprise a plurality, e.g., two, voltage measurement elements (e.g., measuring a voltage between an ATE-side of the DUT contacting structure and ground and a voltage between a DUT side of the DUT contacting structure, e.g., via the DUT contact and ground) in order to measure the voltage of the DUT contacting structure and/or DUT contact. As explained before, with measured voltage and current, an energy heating the DUT contacting structure and/or the DUT contact may be determined or taken into consideration in the thermal model allowing for a precise determination of the temperature of the DUT contacting structure.

According to further embodiments of the disclosure, the ATE resource comprises an ATE port for providing the signal applied to the DUT contacting structure. Furthermore, a decoupling capacitor is coupled to the ATE port and the decoupling capacitor is configured to stabilize the signal provided by the ATE port. Alternatively, or in addition, the decoupling capacitor is configured to decouple the DUT from noise generated by other circuitry elements of the ATE. Inventive concepts may also be applied to ATE setups comprising additional circuitry, e.g., a decoupling capacitor.

According to further embodiments of the disclosure, the control device is configured to consider an influence of the decoupling capacitor on the signal applied to the DUT contacting structure, in order figure out the temperature of the DUT contacting structure.

As explained before, one portion of a feeding signal provided by the ATE port may be conducted to the coupling capacitor, such that only another portion of the feeding signal is applied to the conducting structure. This influence, or for example, this difference between e.g., measured ATE port signal and signal effectively applied to the conducting structure may be taken into consideration by the control device. Hence, with limited measurement complexity (ATE port signal e.g., current) adapted via signal losses, e.g., current conducted to the capacitor, a precise information about the signal applied to the DUT contacting structure and hence its temperature may be determined.

According to further embodiments of the disclosure, the control device is configured to consider an influence of the decoupling capacitor using a measurement of the current of the signal applied to the DUT contacting structure; and using a predetermined information about a target voltage of the DUT, and/or using a measurement of a voltage between (e.g. potential difference between) an ATE-sided end of the DUT contacting structure and a DUT contact of the DUT, and/or using a voltage measurement of the DUT.

The decoupling capacitor may, for example, be arranged in parallel to the DUT and DUT conducting structure. Hence, a current conducted to the decoupling capacitor may be determined or approximated using a voltage difference or a voltage gradient of the voltage provided to the DUT conducting structure and/or DUT. This course of the voltage may be determined using an information about a predetermined target voltage or measurements. As an example, the second measurement unit may be configured to provide such measurements. Hence, the influence of the capacitor may be a current $i_c = dU/dt$, (with $dU/dt$ being the voltage change, e.g., difference or gradient) that may be subtracted from the current measured at the ATE port, in order to determine the current applied to the conducting structure. Hence, the temperature of the conducting structure may be determined precisely.

According to further embodiments of the disclosure, the automated test equipment comprises a source regulation configured to regulate a voltage and/or a current of an ATE output signal which is provided to the DUT contacting structure. Furthermore, the control device is configured to, e.g. dynamically; e.g. in real-time, influence the source regulation, e.g. by changing a voltage target value and/or a current target value, or for example by deactivating the ATE output signal, or for example by changing a speed of a temporal evolution of the target voltage or of the target current, based on the figured out temperature of the DUT contacting structure, e.g. in response to a detection that a modeled, e.g. instantaneous, temperature reaches or exceeds a threshold value, or in a gradual manner, wherein the figured out temperature comprises at least one of a determined temperature or an estimated temperature.

Hence, an inventive control device may be incorporated in an existing ATE system, influencing a source regulation. Consequently, advantages of the inventive concept may be used in existing ATE systems with limited additional complexity.

According to further embodiments of the disclosure, the automated test equipment is configured to mark a test as failed in response to the fact that the control device has influenced the signal applied to the DUT contacting structure or in response to the fact that the control device has influenced the signal applied to the DUT contacting structure by more than a predetermined allowable degree.

An influence of the control device on the signal applied to the DUT contacting structure and hence on the DUT may alter predetermined test specifications.

Therefore, although it may be of greater importance to avoid hardware damage, a test cycle may have to be marked as failed, or not performed according to the specification, in case the signal is influenced. This may allow to sort out test results easily, for example in an automated manner, such that the inventive damage mitigation does not lead to wrongly interpreted tests.

According to further embodiments of the disclosure, the automated test equipment is configured to provide a signal, which is applied to one or more force DUT contacting structures. In addition, the automated test equipment is configured to receive a sense signal from one or more sense DUT contacting structures, wherein, for example, the sense signal represents a voltage resulting on the DUT from the signal applied to the one or more force DUT contacting structures. Furthermore, the automated test equipment is configured to determine a potential difference, e.g., voltage, between an ATE-sided end of one of the force DUT contacting structure and the sense signal. Moreover, the automated test equipment is configured to determine the temperature using the thermal model and using the determined potential difference.

In practical applications, the DUT contacting structure may comprise one or more force DUT contacting structures and/or one or more sense DUT contacting structures. A current provided to the DUT contacting structure may be provided to the DUT via a plurality of force DUT contacting structures, e.g., force probe needles, such that the load on each of the force DUT contacting structures is reduced, hence reducing thermal wear. The thermal model may take such structures in consideration to accurately provide an information about the temperature in the DUT contacting structure or even a differentiated information about force DUT contacting structure temperatures and/or sense DUT contacting structures.

According to further embodiments of the disclosure, the thermal model is configured to consider a thermal history, e.g., when a sequence of pulses is applied to the DUT contacting structure and the DUT contacting structure does not have sufficient time to return to an initial temperature between two current pulses.

The thermal history may, for example, be incorporated in a state information of the thermal model, e.g., in the form of a state of a thermal state space model. A thermal history may, for example, as well be stored in a table or series of data points. Based on the thermal history, the temperature estimation or determination may be performed with increased accuracy.

According to further embodiments of the disclosure, the thermal model is configured to consider an actual, e.g., current, contact resistance at a transition from the DUT contacting structure to a DUT contact, e.g., using a just-in-time resistance measurement or using a just-in-time measurement of a voltage drop at the transition, wherein the DUT is electrically coupled to the automated test equipment using, or for example via, the device under test contact.

The transition may, for example, be an interface between the DUT contacting structure and the DUT contact. The interface or transition may be the contacting surface between contacting structure and DUT contact. Considering the contact resistance may allow figure out the temperature of the DUT contacting structure and/or of the DUT contact accurately.

Further embodiments according to the disclosure comprise a control device for controlling an automated test equipment (ATE) for testing a device under test (DUT) which is electrically coupled to the automated test equipment using, or for example via, a device under test contact, e.g. DUT pad, DUT bga ball, wherein the control device is configured figure out a temperature of the DUT contact using a thermal model, e.g. using a thermal model of the DUT contact or using a thermal model comprising a thermal model of the DUT contact. In addition, the control device is configured to influence, e.g., to control, to regulate, to deactivate, and/or to limit a signal applied to the DUT contact based on the figured out, e.g., modeled, temperature, wherein the figured out temperature comprises at least one of a determined temperature or an estimated temperature.

Based on similar considerations as explained before, a control device may, for example, figure out a temperature of the DUT contact without figuring out a temperature of the DUT contacting structure, wherein the figured out temperature comprises at least one of a determined temperature or an estimated temperature. Hence, an influence of the signal applied to the DUT contacting structure may be performed based on the temperature of the DUT contact.

However, it is to be noted that all aspects, features and functionalities explained before in the context of a figuring out a temperature of a DUT contacting structure may be incorporated or used with or added to the control device configured to figure out the temperature of the DUT contact, individually or taken in combination.

According to further embodiments of the disclosure, the device under test contact is a DUT pin or a DUT pad, e.g., DUT bond pad or DUT test pad, and/or a DUT ball grid array (bga) ball.

Further embodiments according to the disclosure comprise a method for controlling an automated test equipment (ATE) for testing a device under test (DUT) which is electrically coupled to the automated test equipment using, or for example via, a device under test contacting structure, e.g., using or via a probe needle or using or via a DUT socket. The method comprises figuring out a temperature of the DUT contacting structure using a thermal model, e.g. using a thermal model of the DUT contacting structure or using a thermal model comprising a thermal model of the DUT contacting structure, and influencing, e.g. to control, to regulate, to deactivate, and/or to limit, a signal applied to the DUT contacting structure based on the figured out, e.g. modeled, temperature, wherein the figured out temperature comprises at least one of a determined temperature or an estimated temperature.

Further embodiments according to the disclosure comprise a method for operating an automated test equipment (ATE), for testing a device under test (DUT) which is electrically coupled to the automated test equipment using, or for example via, a device under test contacting structure, e.g., using or via a probe needle or using or via a DUT socket. The method comprises providing, with an ATE resource, e.g. a device power supply or a digital channel module or an analog channel module, a signal applied to the DUT contacting structure and figuring out a temperature of the DUT contacting structure using a thermal model and influencing the ATE resource, in order to influence the signal applied to the DUT contacting structure, based on the figured out temperature, wherein the figured out temperature comprises at least one of a determined temperature or an estimated temperature.

Further embodiments according to the disclosure comprise a method for controlling an automated test equipment (ATE) for testing a device under test (DUT) which is electrically coupled to the automated test equipment using, or for example via, a device under test contact, e.g., DUT pad, DUT bga ball. The method comprises figuring out a temperature of the DUT contact using a thermal model, e.g., using a thermal model of the DUT contact or using a thermal model comprising a thermal model of the DUT contact, and influencing, e.g., to control, to regulate, to deactivate, and/or to limit, a signal applied to the DUT contact based on the figured out, e.g., modeled, temperature, wherein the figured out temperature comprises at least one of a determined temperature or an estimated temperature.

Further embodiments according to the disclosure comprise a computer program for performing any of the methods described herein, when the computer program runs on a computer.

The methods as described above are based on the same considerations as the above-described control devices and/or automated test equipment. The methods can, by the way, be completed with all features and functionalities, which are also described with regard to the control devices and/or automated test equipment's.

This summary is provided to introduce a selection of principles of the disclosure in a simplified form that are further described below in the Detailed Description section. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments, together with the description, serve to explain the principles of the disclosure.

Embodiments of the present disclosure are set out below in the figures.

The drawings are not to scale, emphasis instead generally being placed upon illustrating the principles of the disclosure. In the following description, various embodiments of the disclosure are described with reference to the following drawings.

FIGS. 1A, 1B, and 1C show a schematic view of an IC wafer-level testing setup for testing of devices under test.

Figure 2:
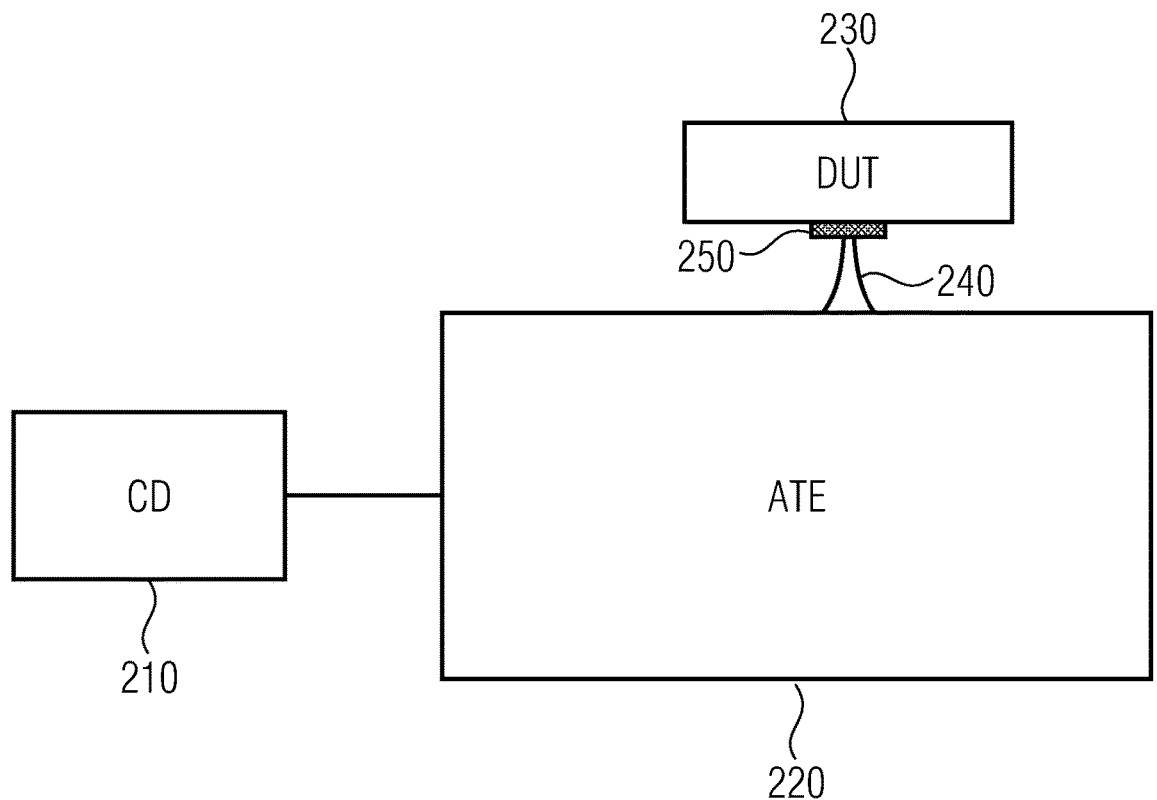

FIG. 2 shows a control device for controlling an automated test equipment according to embodiments of the disclosure.

Figure 3:
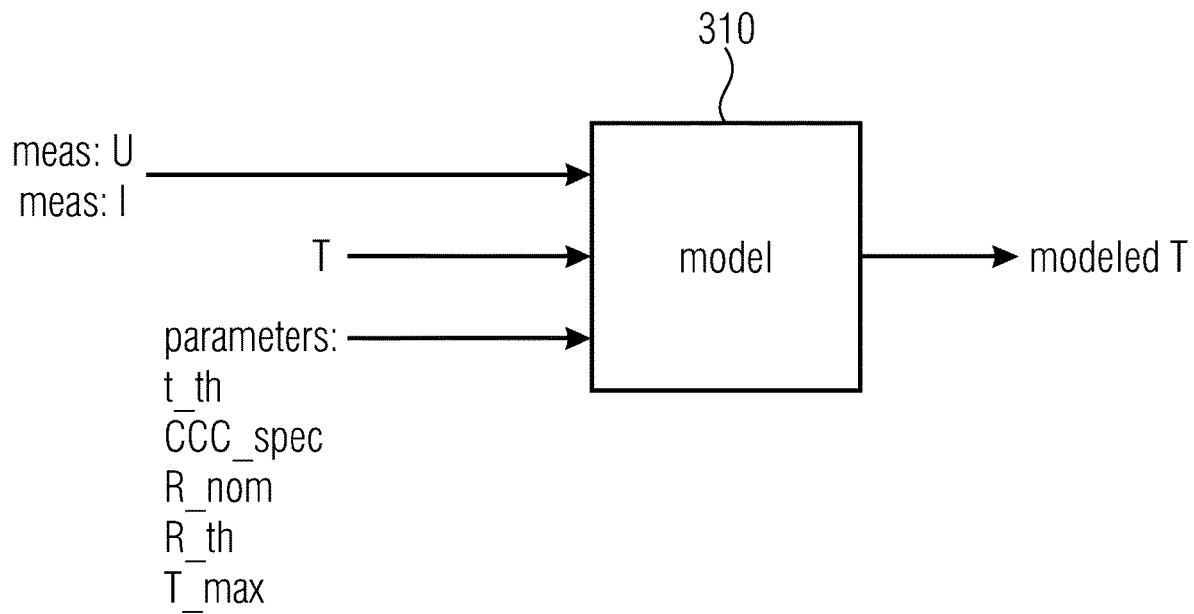

FIG. 3 shows a schematic view of a thermal model according to embodiments of the disclosure.

Figure 4:
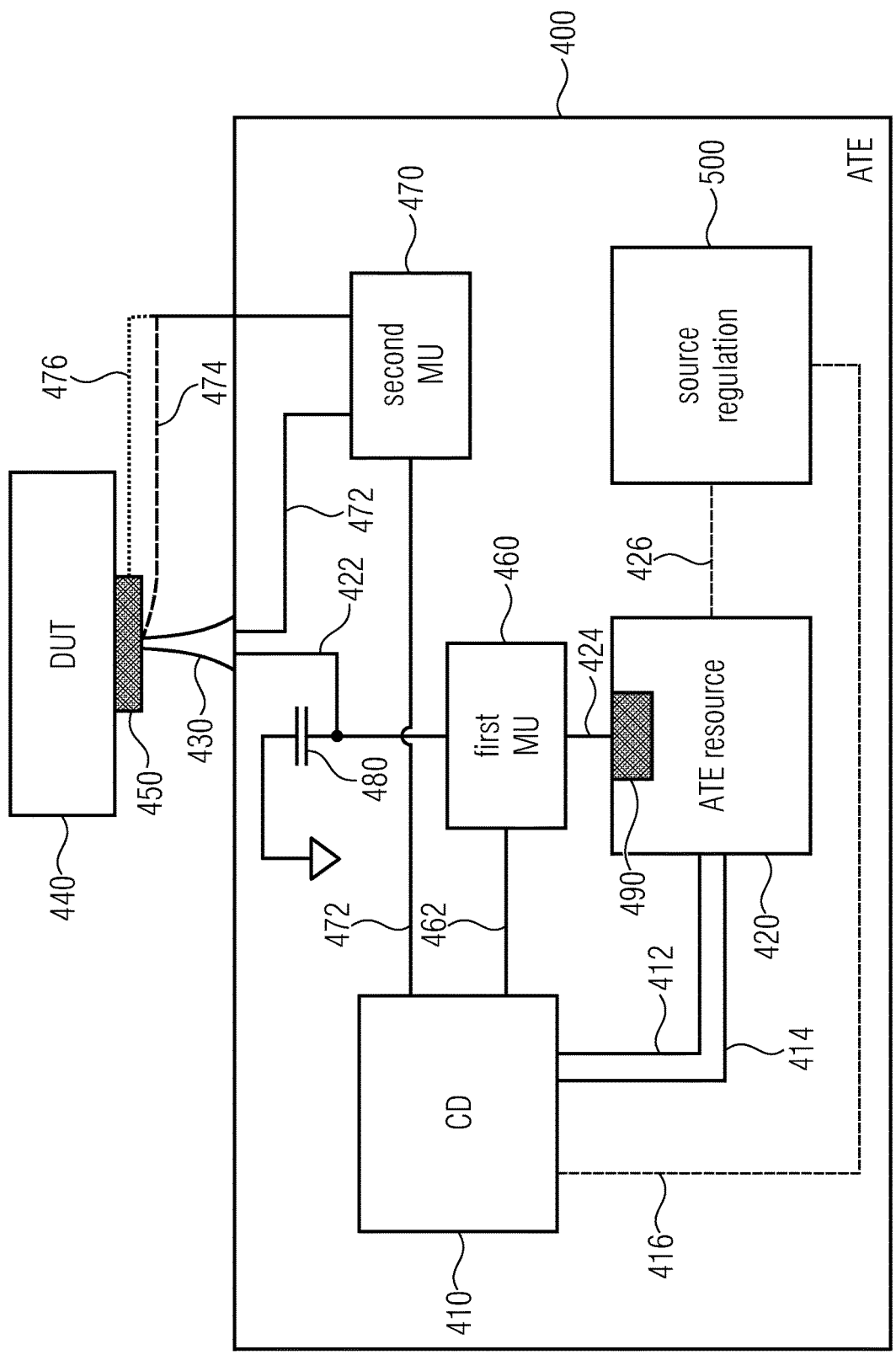

FIG. 4 shows an automated test equipment (ATE) according to embodiments of the disclosure.

Figure 5:
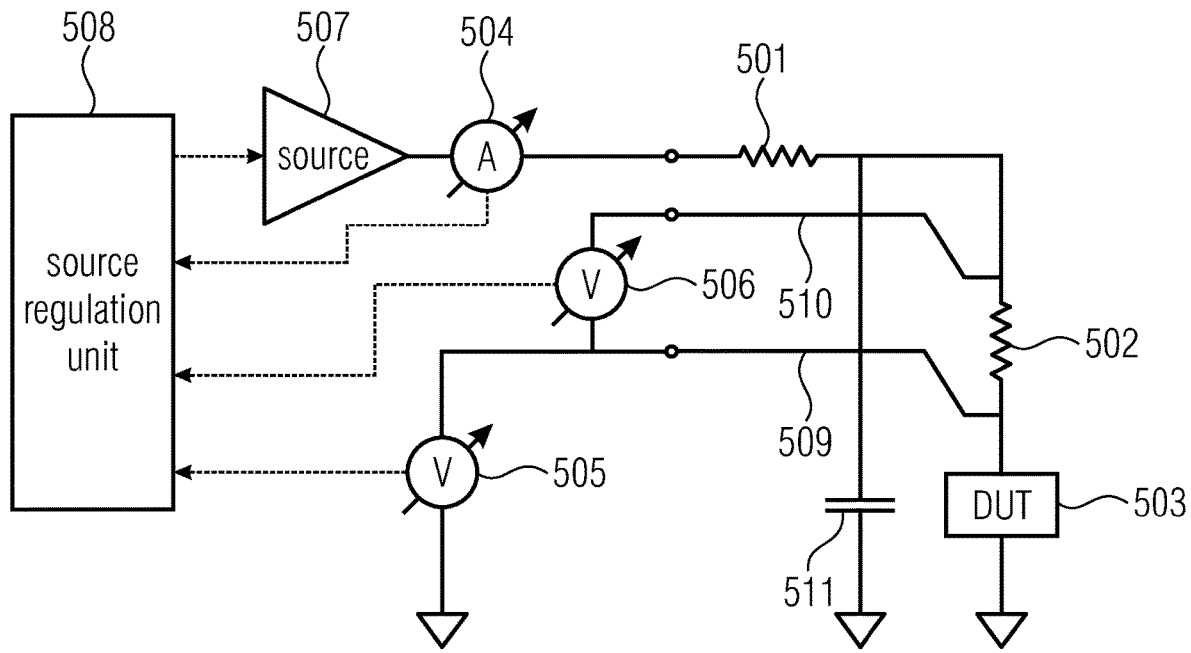

FIG. 5 shows a schematic view of measurements units of an automated test equipment (ATE) according to embodiments of the disclosure.

Figure 6:
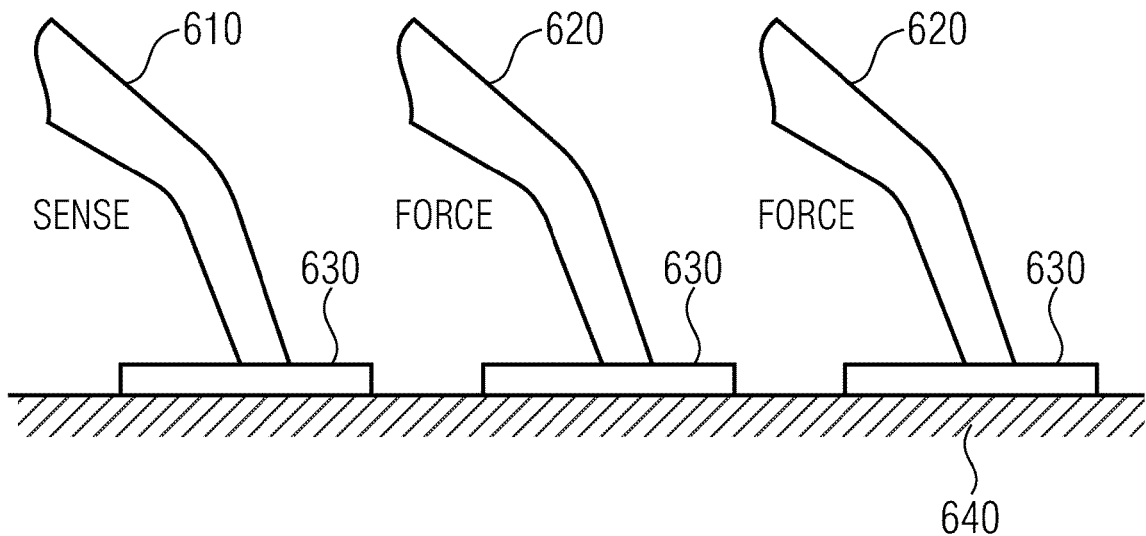

FIG. 6 shows a schematic side view of a DUT contacting structure according to embodiments of the disclosure.

Figure 7:
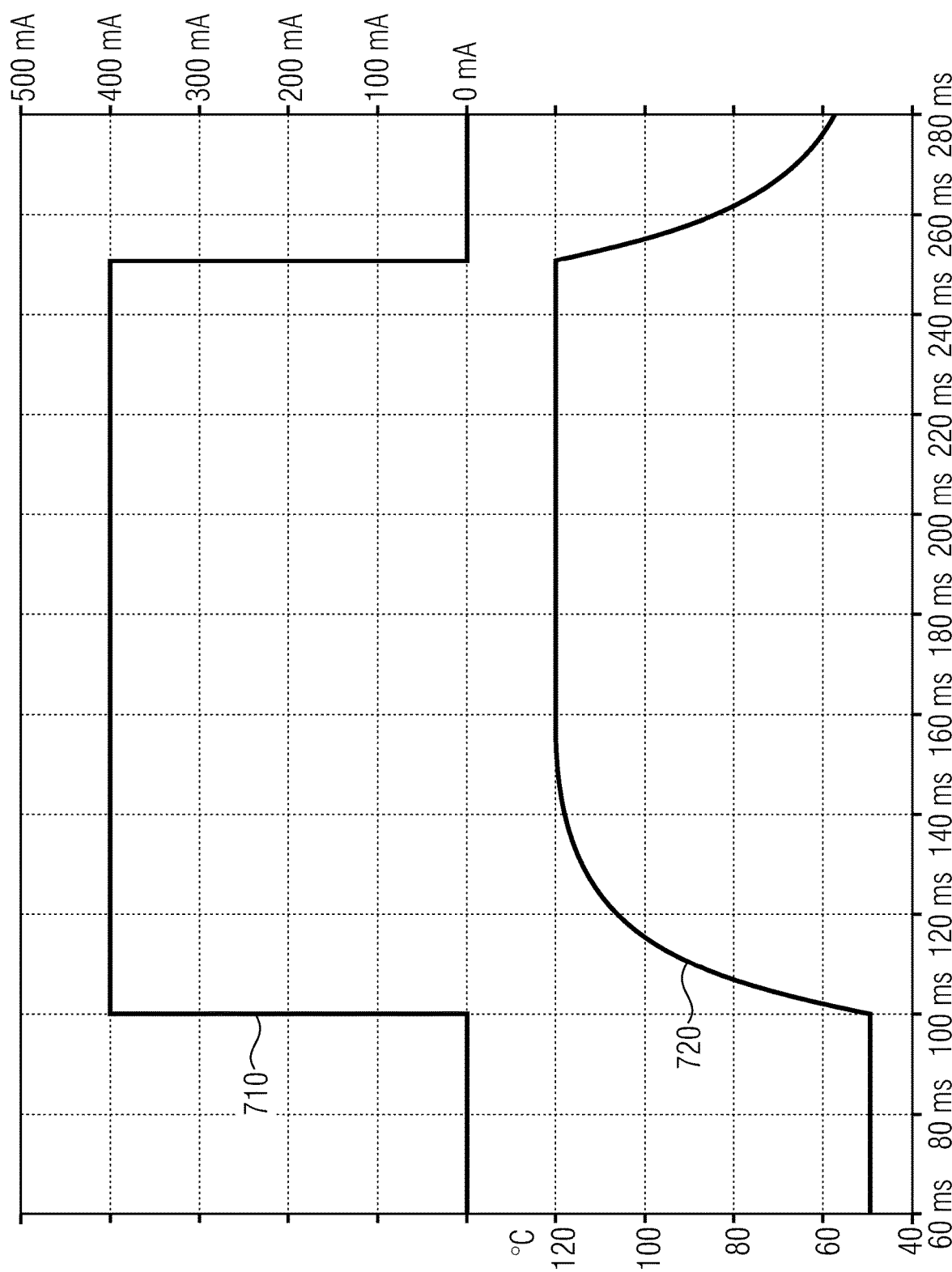

FIG. 7 shows a first example of a temperature of a DUT contacting structure and a current provided to the DUT contacting structure over time.

Figure 8:
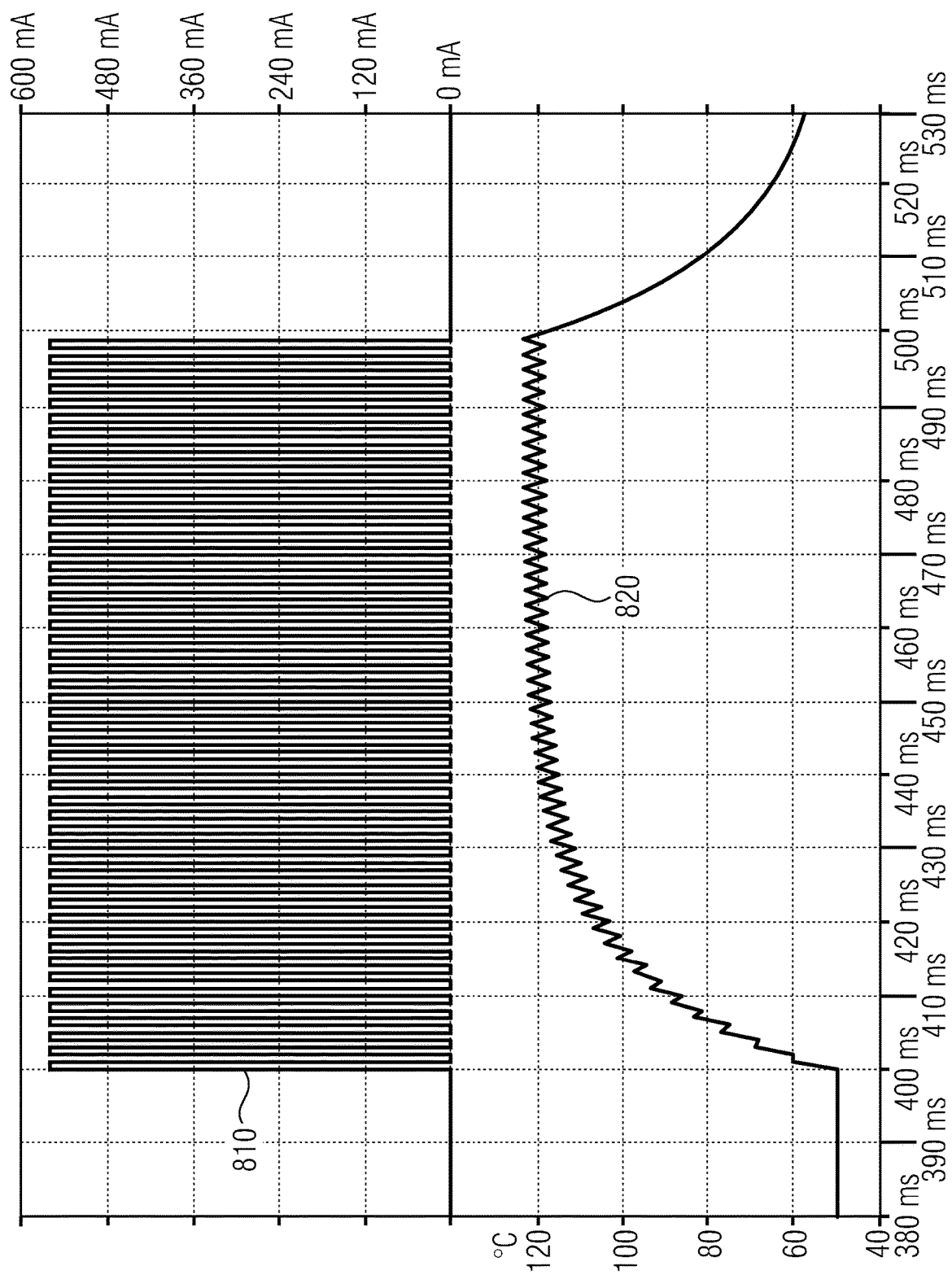

FIG. 8 shows a second example of a temperature of a DUT contacting structure and a current provided to the DUT contacting structure over time.

Figure 9:
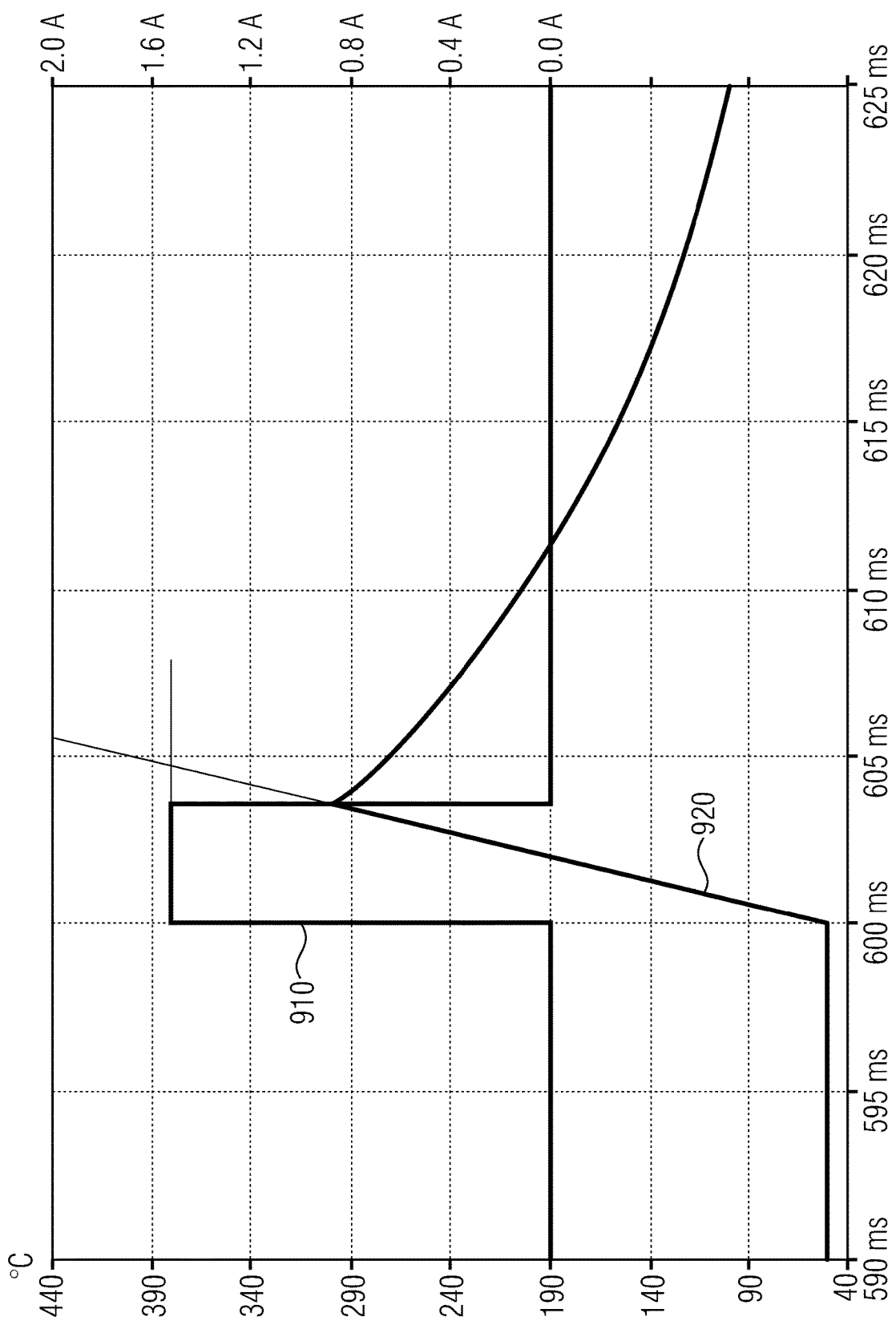

FIG. 9 shows a third example of a temperature of a DUT contacting structure and a current provided to the DUT contacting structure over time.

Figure 10:
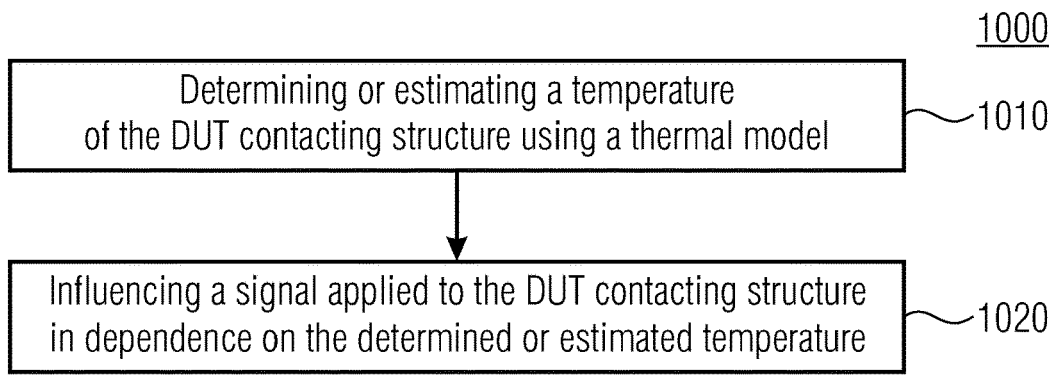

FIG. 10 shows a first method for controlling an automated test equipment according to embodiments of the disclosure.

Figure 11:
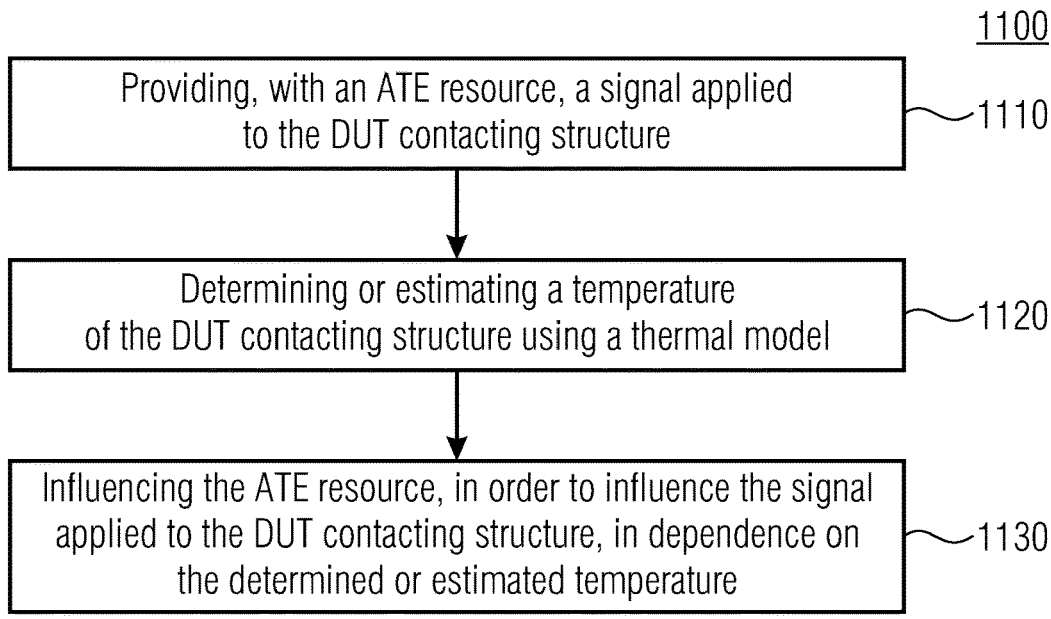

FIG. 11 shows a method for operating an automated test equipment according to embodiments of the disclosure.

Figure 12:
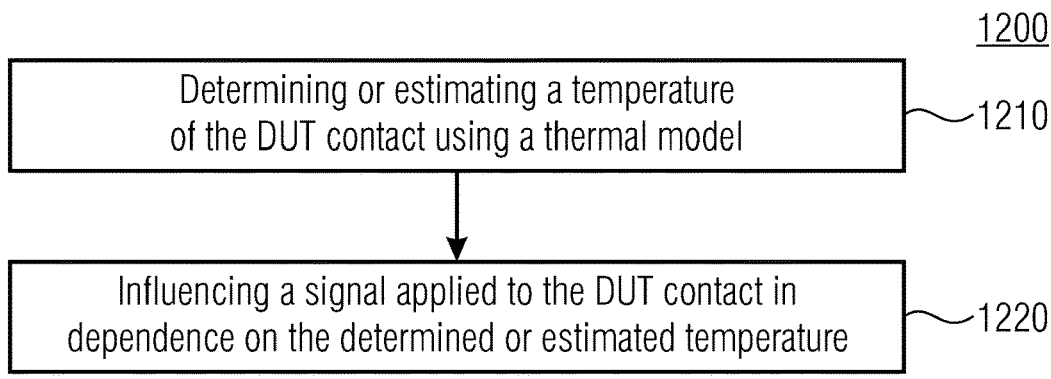

FIG. 12 shows a second method for controlling an automated test equipment according to embodiments of the disclosure.

DETAILED DESCRIPTION

Reference will now be made in detail to embodiments, examples of which are illustrated in the accompanying drawings. While the disclosure will be described in conjunction with these embodiments, it should be understood that they are not intended to limit the disclosure to these embodiments. On the contrary, the disclosure is intended to cover alternatives, modifications, and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

FIG. 2 shows a control device for controlling an automated test equipment according to embodiments of the disclosure. FIG. 2 shows a control device 210 for controlling an automated test equipment (ATE) 220. As optionally shown, the ATE 220 is electrically coupled to a device under test (DUT) 230 with a DUT contacting structure 240. As another optional feature, the electrical coupling is provided additionally with a DUT contact 250. In general, electrical coupling may be provided with at least one of the DUT contact structure 240 and the DUT contact 250.

The ATE 220 may be configured to perform electrical tests on the DUT 230. Therefore, in the example of FIG. 2, an electrical connection is provided via the DUT contacting structure 240 and the DUT contact 250. During testing, signals provided by the ATE 220, via the DUT contacting structure 240, to the DUT 230, may increase the temperature of the DUT contacting structure 240 and/or the DUT contact 250. For example, in order to prevent overheating of the structure 240, the control device may simulate a thermal model, in order to track the temperature of the structure 240. Based on the temperature, the control device may adapt the signals provided by the ATE in order to influence the temperature of the structure 240, hence preventing thermal damage. Vice versa, the thermal model may be configured to simulate the temperature of the DUT contact 250, and/or a temperature of a transition between the DUT contacting structure 240 and the contact 250 and/or a combination of the DUT contacting structure 240 and the contact 250. Based on such temperature simulations or estimations, the signal applied to the DUT contacting structure 240 may be adapted.

The device under test contact may, for example, be a DUT pin or a DUT pad, e.g., DUT bond pad or DUT test pad, and/or a DUT ball grid array (bga) ball.

FIG. 3 shows a schematic view of a thermal model according to embodiments of the disclosure. As an example, the thermal model 310 comprises measured voltage and current inputs U and I and parameter inputs. As an example, the model 310 is provided with a temperature T, a thermal constant for a temperature change t_th, a nominal current of the conductive structure CCC_spec, a nominal resistance of the conductive structure R_nom, a thermal resistance for a temperature change R_th and a maximum temperature T_max. As an example, the model 310 may output a temperature modeled T.

Based on the inputs, the thermal model 310 may be simulated in real time, e.g., within time limits that may allow to adapt a signal applied to the DUT before thermal damage occurs. Hence a fast influence and/or regulation of test signals may be performed.

The thermal model 310 may optionally comprise different inputs. Depending on a specific application and type of thermal model other input parameters may be used in order to determine a temperature of the DUT contacting structure and/or the DUT contact pad. Further examples for inputs of model 310 and/or for information which may be used by the control device in order to figure out the temperature of the DUT contacting structure and/or the temperature of the DUT contact, may be an environmental temperature, e.g. an air temperature or a temperature of a load board on which the DUT contacting structure is mounted, a wafer temperature, e.g. of the DUT, a die temperature, e.g. of the DUT, a current carrying capability of the DUT contacting structure, a heat conduction value of the DUT contacting structure, a heat convections value of the structure and/or a duration, for example a duration during which the signal is applied to the DUT contacting structure.

In addition, it is to be noted, that any or all of the above mentioned temperatures, used as inputs for the model or the control device, may be measured or may be predetermined set point temperatures.

Furthermore, model 310 may be any type of model suitable to provide a temperature information that may allow to prevent thermal damage on the DUT contacting structure and/or the DUT contact. Hence, the thermal model 310 may, for example, be a thermal model of the DUT contacting structure, or of the DUT contact, or of the DUT contacting structure and the DUT contact, wherein the DUT contacting structure and the DUT contact may be two distinct model parts of which an interaction is modeled, or wherein the thermal model 310 describes the DUT contacting structure and the DUT contact as an inseparable system. As an example, the model 310 may, for example, be a state space model, or any other model described within a simulation software, e.g., LTspice® or MATLAB.

Instead, or in addition to the model 310 comprising structurally different parts, a parametrization of the model 310 may be adapted in order to represent different aspects of the connection between DUT contacting structure and DUT contact. As an example, nominal parameters, e.g., a nominal resistance, may, for example, model a certain aspect of the thermal behavior of the DUT conducting structure and/or the DUT contact. The model 310 may be an adaptive model, for example, adapting the parameters, e.g., nominal resistances, depending on a state of the model. With an elevated temperature, resistances of conducting structure and contact may alter. Hence, model parameters may be adapted.

This adaptation may as well be performed in order to include a behavior of the DUT contact or of a transition between DUT contacting structure and DUT contact in a more generic thermal model 310, for example only describing the DUT contacting structure with nominal parameters. The adaptations may be performed by the control device.

Furthermore, an inventive control device may use the thermal model 310 in order to track the estimated temperature of the DUT contacting structure and/or DUT contact over time, for example in order to analyze the temporal evolution of the temperature.

As explained before, one inventive advantage of using the thermal model is the possibility to determine or evaluate the temperature of the DUT contacting structure, for example significantly, faster than this may be possible with a measurement, which would even add additional complexity and costs because of additional hardware. In order to make use of this speed, the control device may, for example, determine or estimate the temperature of the DUT contacting structure using a temporal resolution of at most $\frac{1}{100}$ of a thermal time constant of the DUT contacting structure.

As another optional feature, model 310 may consider or track or save a thermal history, for example, when a sequence of pulses is applied to the DUT contacting structure and the DUT contacting structure does not have sufficient time to return to an initial temperature between two current pulses.

Another input for the thermal model may, for example, be an actual contact resistance e.g., at a transition from the DUT contacting structure to the DUT contact.

FIG. 4 shows an automated test equipment (ATE) according to embodiments of the disclosure. FIG. 4 shows ATE 400 comprising a control device 410 and an ATE resource 420. The ATE resource 420 is configured to provide a signal 422 applied to the DUT contacting structure. A DUT 440 is electrically coupled to the ATE 400, via the DUT contacting structure 430 and a DUT contact 450. The control device 410 is configured to influence 412 the ATE resource 420 in order to influence the signal 422 applied to the DUT contacting structure 430 based on a figured out temperature, wherein the figured out temperature comprises at least one of a determined temperature or an estimated temperature. The temperature may be, as explained before, a figured out (estimated or determined) temperature of the DUT contacting structure 430, of the DUT contact 450, or a temperature of a contact arrangement comprising the DUT contacting structure 430 and the DUT contact 450. As explained before, temperature estimation or determination may be performed by the control device 410 using a thermal model.

As another optional feature, the ATE 400 comprises a first measurement unit 460 and a second measurement unit 470. The first measurement unit 460 may measure a signal 424, e.g., a current of the signal 422 applied to the DUT contacting structure 430. The second measurement unit 470 may measure a voltage or potential difference of the DUT contacting structure 430. Signal 424 may, for example, be approximately equal, or even equal, to signal 422. However, the first measurement unit 460 may alter signal 424 and additional circuitry, for example an optional decoupling capacitor 480 may as well cause a difference between the signal 422 provided to the DUT contact structure 430 and the signal 424 provided by the ATE resource 420.

As another optional feature, shown in FIG. 4, the ATE resource may comprise an ATE port 490 for providing the signal 422 applied to the DUT contacting structure 430. In addition, the decoupling capacitor 480 may be configured to stabilize the signal 422 provided by the ATE port 490 and/or to decouple the DUT 440 from noise generated by other circuitry elements of the ATE 400.

In practical application, the voltage measurement of the second measurement unit 470, may be performed in a different ways. It may, for example, be challenging to exactly measure of voltage drop over the conducting structure 430 because of a low resistance of the conducting structure and influences of necessary measurement lines towards the second measurement unit 470. In general, the second measurement unit 470 may measure a voltage between an ATE sided end of the DUT contacting structure and a DUT contact of the DUT. However, the potential difference measured may, for example, as well be equal to a potential difference over the DUT contacting structure 430 or may include a potential difference over the DUT contacting structure 430 or may approximates a potential difference across the DUT contacting structure 430 or may represent a potential difference across the DUT contacting structure 430 or may represent a voltage drop between an ATE-sided end of the DUT contacting structure 430 and a contact pad of the DUT 450 or may represent a voltage drop between an ATE-sided end of the DUT contacting structure 430 and a DUT contact 450 or may represent a voltage drop at a transition to the DUT 440 including the DUT contacting structure 430. This is shown in FIG. 4 with the optional measurement lines 472, 474 and 476. As an example, the voltage of the conductive structure 430 may be measured precisely between one end of the conductive structure and the other end of the conductive structure (472+474). However, this may, for example, no be possible, hence the voltage of the conductive structure 430 may be measured between one end of the conductive structure and the DUT contact 450 (472+476).

Anyways, the first and second measurement units 460, 470 may provide 462, 472 their respective measurement results to the control device 410. The control device 410 may evaluate the thermal model using the measurements, for example in order to decide whether to influence the signal applied to the DUT contacting structure 422, e.g., via influencing signal 424 by influencing the ATE resource 420.

The control device 410 may be configured figure out a temperature of the DUT contacting structure 430 based on a voltage, measured according to any of the explained options, and the signal 424, e.g., current, measured by measurement unit 460.

Hence, according to an embodiment, the control device 410 may for example figure out the temperature of the DUT contacting structure 430 using the thermal model and using a voltage measurement which describes a voltage drop across the DUT contacting structure 430 or across a transition towards the device under test 440 which includes the DUT contacting structure 430, and using a current measurement which describes, at least approximately, a current flowing through the DUT contacting structure 430, wherein the figured out temperature comprises at least one of a determined temperature or an estimated temperature.

According to another embodiment, the control device 410 may determine a voltage between an ATE-sided end of the DUT contacting structure 430 and a DUT contact 450 of the DUT, and may use the determined voltage for the determination or estimation of the temperature of the DUT contacting structure 430 using the thermal model.

As another optional feature, the control device 410 may determine the signal 424, e.g., a current, provided by the ATE port 490 coupled with the DUT contacting structure 430, or the signal 422, e.g., a current flowing through the DUT contacting structure 430, and to use the determined signal, e.g., current for the determination or estimation of the temperature of the DUT contacting structure 430 using the thermal model. In other words, the control device, may for example, not be readily provided with exact information on signals 424 and/or 422 and may therefore determine these signal, e.g., based on disturbed measurements of the first measurement unit 460, e.g., using further measurement information provided by other sensors of the ATE.

As explained before, elements such as decoupling capacitor 480, may alter the signal 424 provided by the ATE port 490, such that signal 422 at the DUT contacting structure 422 is not equal to signal 424. Therefore, as another optional feature, the control device 410 may, for example measure, or receive a measurement of a signal 424, e.g., current provided by the ATE port 490, and may determine a signal, e.g., a current, flowing through decoupling capacitor 480 and may derive the signal 422, e.g., current flowing through the DUT contacting structure 422, using the measured current 424 and using the determined current flowing through the decoupling capacitor 480.

Consequently, as another optional feature, the control device 410 may, for example, consider an influence of the decoupling capacitor on the signal 422 applied to the DUT contacting structure, in order figure out the temperature of the DUT contacting structure 430. This may comprise, as explained before, taking into consideration a current loss to the decoupling capacitor 480 from the, for example, measured signal 424, such that only a part of signal 424 is provided to the DUT contacting structure 430.

Furthermore, optionally, in order to take the impact or influence of the decoupling capacitor on signal 424 into account, the control device 410 may, for example, use a measurement of the signal 424, e.g. performed by the first measurement unit 460, of the signal applied to the DUT contacting structure and at least one of an information about a target or test voltage, that may be a set point value for the DUT, a measurement of the voltage of the DUT contacting structure, e.g. in any approximation or form, as explained before and/or a voltage measurement of the DUT.

As another optional feature, the control device 410 may influence 414, e.g., control or deactivate, the signal 422 applied to the DUT contacting structure 430 based on the figured out temperature, wherein the figured out temperature comprises at least one of a determined temperature or an estimated temperature. Therefore, the control device 410 may, for example, instruct the ATE resource 420 to adapt or change or deactivate signal 424. Such a deactivation may, for example, be performed in real time, for example such that a reaction to a temperature increase may be performed faster than the temperature exceeding a critical threshold. As an example, deactivating the signal 422 applied to the DUT contacting structure 430 may be performed within a time of less or equal than two times a temporal resolution of the control device.

As another optional feature, the signal 422 applied to the DUT contacting structure 430 may be at least one of a test-signal, e.g., a test-stimulus, and/or a power supply signal, e.g., a current. Optionally, the DUT contacting structure 430 may, for example comprise or may even be a probe needle and/or a conductor of a DUT socket, e.g., of a DUT test socket.

As another optional feature, the control device 410 may, for example, be configured to detect that a temperature of the DUT contacting structure exceeds a predetermined threshold, or may increase faster than a predetermined temperature gradient threshold. In reaction to such a detection, the control device 410 may shout down or switch off or limit the signal 422 applied to the DUT contacting structure 422, in order to prevent damage on the DUT contacting structure.

As another optional feature, the control device 410 may, for example, determine a heating power using a formation of a product calculation, receiving a first factor form the first measurement unit 460 providing a current measurement and receiving a second factor from the second measurement unit 470 providing a voltage measurement, for example, in order to use the heating power as an input of the thermal model in order to simulate the thermal model with this information. This may allow to figure out the temperature of the DUT contacting structure with high accuracy.

As another optional feature, ATE 400 may comprise a source regulation 500. The source regulation 500 may be configured to regulate a voltage and/or a current of an ATE output signal which is provided to the DUT contacting structure. As an example, the source regulation 500 shown in FIG. 4 may influence 426 the ATE resource 420, e.g., in order to provide signal 424 with predetermined characteristics, e.g., in case the control device 410 detects a thermal runaway of the DUT contacting structure 430, the control device may influence 416 the source regulation in order to adapt signal 424. As another example, the source regulation 500 may, for example comprise the control device 410 or the control device 410 may comprise the functionality of the source regulation 500. The inventive concept is not limited to a specific distribution of functionality within an inventive ATE 400.

Optionally, the control device 410 may be configured to evaluate the signals received and/or the inputs provided by itself in order to provide a validation information for the test or for example test cycle. The control device 410 may, for example, label a test as unsuccessful, in case control device 410 had to influence 414 the ATE resource and/or had to influence 416 the source regulation 500, in order to influence signal 424.

FIG. 5 shows a schematic view of measurement units of an automated test equipment (ATE) according to embodiments of the disclosure. FIG. 5 shows a tester source 507 that is connected via a signal path, represented as 501 and a probe needle 502 to the DUT. The current 504 is measured. A decoupling capacitor 511 might exist. Current flow thru the probe needle 502 generates voltage drop, which is measured using dedicated measure lines 509 and 510. The DUT voltage is measured 505. The source 507 is controlled by a source regulation unit 508, which gets the target parameter settings like voltage and clamp current. The dissipated power of the probe needle 502 causes temperature increase. The product of the measured current 504, the measured voltage drop over the probe needle and the time may be equal to the heat energy of the probe needle, provided that energy flow into the decoupling capacitor 511 is, at least approximately, neglectable, which can be assumed in DUT supply steady cases.

A thermal model within the source regulation unit is applied to calculate an approximated temperature change of the probe needle. As an example, the source regulation unit may be or may comprise the control device configured to evaluate the thermal model. It uses the measured current 504 and voltages 505 and 506 and combines them with parameters like current carrying capability of the probe needle, approximated heat conduction and heat convection value, ambient temperature and time. As a result, an increased approximated temperature may lead to a reduced current in the source regulation unit 508 to drive the temperature of the probe needle 502 down to prevent further extended thermal stress.

Thermal runaway may be interrupted by early detection of stress factors.

FIG. 6 shows a schematic side view of a DUT contacting structure according to embodiments of the disclosure. FIG. 6 shows a DUT contacting structure comprising a sense DUT contacting structure 610 and two force DUT contacting structures 620. The structures are coupled to a DUT contact of a DUT 640 comprising three DUT contact pads 630.

In general, an ATE according to embodiments of the disclosure may apply a signal to one or more force DUT contacting structures 620 and may receive a sense signal from one or more sense DUT contacting structures 610. In addition, the ATE, for example the control device of the ATE, may determine a potential difference between an ATE sided end of one of the force DUT contacting structure and the sense signal and the ATE, for example the control device of the ATE, may determine the temperature using the thermal model and using the determined potential difference.

Referring to FIG. 5 with regard to FIG. 6: There is a dedicated measure line 509 which should end up on the DUT die to get an accurate core voltage through sensing. The force probe needle with contact resistance is represented as 502. In reality, according to embodiments, there may be multiple force probe needles in parallel to distribute the needed current. A sense probe needle may be used to measure accurately the core voltage on the DUT die.

The die at the bottom is (here e.g., in FIG. 6, DUT 640) supplied by 2 FORCE probe needles. The sense probe needle is 509. 509, 510 measures the voltage drop 506 across the paralleled FORCE probe needles during current flow, caused by 502.

In the following aspects and advantages of the disclosure are explained referring to FIGS. 7 to 11, showing modeled temperature case studies.

FIG. 7 shows a first example of a temperature of a DUT contacting structure and a current provided to the DUT contacting structure over time. At 100 ms a DC current 710 of 400 mA is provided to a DUT contacting structure at an ambient temperature of 50° C. The temperature 720 of the DUT contacting structure increases within 40 ms to approximately 120° C. The current applied to the DUT contacting structure may, for example be a nominal current for the DUT contacting structure that may lead to a tolerable thermal load on the DUT contacting structure. Hence, the DUT contacting structure may be able to tolerate the temperature of 120° C. without increased thermal wear.

FIG. 8 shows a second example of a temperature of a DUT contacting structure and a current provided to the DUT contacting structure over time. Between 400 ms and 500 ms a pulsed current 810 is applied to the DUT contacting structure at an ambient temperature of 50° C. The duty cycle of the pulsed current is D=50%, in other words an on/off relationship of the current is 50:50. The amplitude of the current is 400 mA×1.4=560 mA. The temperature 820 of the DUT contacting structure also increases within 40 ms to approximately 120° C. and stabilizes, similar to the example shown in FIG. 7.

It is as well to be noted, that the increase in temperature shown in FIG. 8 occurs over a sequence of pulses. Hence, it is advantageous to consider a thermal history, as explained before, in the thermal model, in order to predict or to control the temperature of the DUT contacting structure. Furthermore, a temporal resolution may be chosen according to thermal time constants of the DUT contacting structure, in order to prevent overheating.

FIG. 9 shows a third example of a temperature of a DUT contacting structure and a current provided to the DUT contacting structure over time. At 600 ms a single pulse current 910 with an amplitude of 400 mA·3.8=1.52 A with a duration of approximately 4 ms is applied to the DUT contacting structure at an ambient temperature of 50° C. The temperature 920 of the DUT contacting structure increases within 1 ms to 120° C. Although the pulse current may be 380% of a nominal current value, a short term overload may result in a bounded temperature for the DUT contacting structure, e.g., due to the limited pulse time.

The temperature of the DUT contacting structure increases within less than 4 ms to a temperature above 300° C. Although the increased temperature causes stress and thermal wear, a short term overload may result in a bearable stress for the DUT contacting structure, if the stress condition is eliminated soon enough.

The temperature rise would continue for prolonged current flow. The temperature of the DUT contacting structure would increase within about 6 ms to a temperature above 440° C., within about 10 ms to a temperature above 600° C., with further increase. Such a temperature may be destructive and may lead to or cause damage at the DUT contacting structure. Hence, according to embodiments of the disclosure, countermeasures may be taken. As an example, energy, e.g., in the form of the current, may be reduced early, e.g., before reaching a critical temperature.

As can be seen in FIGS. 7 to 9 a plurality of test signals, e.g., currents, may be applied to DUT contacting structures. Temperatures of the DUT contacting structure may increase within very limited time spans, such that critical temperatures can be surpassed withing short periods of time. As shown in FIGS. 7 to 9, embodiments according to the disclosure may be used for a plurality of test-signals, and may prevent the occurrence of critical temperatures. As an example, a DUT contacting structure may be configured to operate up to approximately 120° C. with limited thermal wear. Hence, a control device according to embodiments may track the temperatures of the DUT contacting structure, e.g., as shown in FIGS. 7 to 9, and may not intervene in the situations shown in FIGS. 7 and 8.

On the other hand, when detecting the rapid increase in temperature, as shown in FIG. 9, a control device may influence the current provided to the DUT contacting structure, before a nominal temperature interval around the 120° C. is surpassed. In addition, as will be apparent to the person skilled in the art, from the time scales shown in FIGS. 7 to 9, a temperature increase may occur too fast for temperature measurements to allow for a quick reaction, e.g., countermeasures. Hence, as recognized by the inventors, the use of a thermal model may allow to react within a critical reaction time before damage is inflicted upon the DUT contacting structure, and even temperature predictions may be performed, in order to intervene before early.

In addition, using the inventive concept, it may be possible to run high current test for a short period of time while still being able to avoid thermal damage on the DUT contacting structure. With the estimation or determination of the temperature of the DUT contacting structure, it may be possible to control the temperature even for such short high current bursts.

FIG. 10 shows a first method for controlling an automated test equipment according to embodiments of the disclosure. The method 1000 for controlling an automated test equipment (ATE) for testing a device under test (DUT), which is electrically coupled to the automated test equipment using, or for example via, a device under test contacting structure, e.g. using or via a probe needle or using or via a DUT socket, comprises figuring out (determining or estimating) 1010 a temperature of the DUT contacting structure using a thermal model, e.g. using a thermal model of the DUT contacting structure or using a thermal model comprising a thermal model of the DUT contacting structure, and influencing 1020, e.g. to control, to regulate, to deactivate, and/or to limit, a signal applied to the DUT contacting structure based on the figured out, e.g. modeled, temperature, wherein the figured out temperature comprises at least one of a determined temperature or an estimated temperature.

FIG. 11 shows a method for operating an automated test equipment according to embodiments of the disclosure. The method 1100 for operating an automated test equipment (ATE), for testing a device under test (DUT), which is electrically coupled to the automated test equipment using, or for example via, a device under test contacting structure, e.g. using or via a probe needle or using or via a DUT socket, comprises providing 1110, with an ATE resource, e.g. a device power supply or a digital channel module or an analog channel module, a signal applied to the DUT contacting structure and figuring out (determining or estimating) 1120 a temperature of the DUT contacting structure using a thermal model and influencing 1130 the ATE resource, in order to influence the signal applied to the DUT contacting structure, based on the figured out temperature, wherein the figured out temperature comprises at least one of a determined temperature or an estimated temperature.

FIG. 12 shows a second method for controlling an automated test equipment according to embodiments of the disclosure. The method 1200 for controlling an automated test equipment (ATE) for testing a device under test (DUT) which is electrically coupled to the automated test equipment using [or via] a device under test contact, e.g. DUT pad, DUT bga ball, comprises figuring out (determining or estimating) 1210 a temperature of the DUT contact using a thermal model, e.g. using a thermal model of the DUT contact or using a thermal model comprising a thermal model of the DUT contact and influencing 1220, e.g. to control, to regulate, to deactivate, and/or to limit, a signal applied to the DUT contact based on the figured out, e.g. modeled, temperature, wherein the figured out temperature comprises at least one of a determined temperature or an estimated temperature.

In general, embodiments according to the disclosure may address problems occurring in wafer testing, wafer probing and testing with probe cards.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the disclosure can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the disclosure comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. An apparatus comprising:
   a control device operable to figure out a temperature of a device under test (DUT) contacting structure using a thermal model and operable to influence a signal applied to the DUT contacting structure based on the figured out temperature, wherein:
   the DUT contacting structure is operable to electrically couple a device under test (DUT) to an automated test equipment (ATE),
   the figured out temperature comprises at least one of a determined temperature or an estimated temperature;
   the thermal model comprises at least one of a thermal model of the DUT contacting structure, a thermal model of a DUT contact operable to electrically couple the DUT to the ATE via the DUT contacting structure, or a thermal model that jointly models the DUT contacting structure and the DUT contact,
   the thermal model comprises a model parametrization, wherein the model parametrization is configured to represent a thermal behavior of the DUT contacting structure,
   the control device is configured to adapt the model parametrization based on at least one of measurements of a current of the signal applied to the DUT contacting structure and measurements of a voltage of the DUT contacting structure, and
   the model parametrization provides at least one of a thermal behavior of an interface of the DUT contacting structure and the DUT contact or a thermal behavior of the DUT contact with the thermal model to figure out the temperature of the DUT contacting structure.

2. The apparatus of claim 1, wherein the control device is configured to figure out the temperature of the DUT contacting structure by using the thermal model, by using a measurement of a potential difference which is at least one of a potential difference over the DUT contacting structure, a voltage drop between an ATE-sided end of the DUT contacting structure and a contact pad of the DUT, a voltage drop between the ATE-sided end of the DUT contacting structure and the DUT contact, or a voltage drop at a transition to the DUT that includes the DUT contacting structure, and by using a current measurement.

3. The apparatus of claim 1, wherein the control device is configured to figure out the temperature of the DUT contacting structure by using the thermal model, by using a voltage measurement which describes a voltage drop which is at least one of across the DUT contacting structure or across a transition towards the DUT which includes the DUT contacting structure, and by using a current measurement which describes, at least approximately, a current flowing through the DUT contacting structure.

4. The apparatus of claim 1, wherein the control device is configured to determine a voltage between an ATE-sided end of the DUT contacting structure and the DUT contact of the DUT, and is configured to use the determined voltage to figure out the temperature of the DUT contacting structure using the thermal model.

5. The apparatus of claim 1, wherein the control device is configured to determine at least one of a current provided by an ATE port coupled to the DUT contacting structure or a current flowing through the DUT contacting structure, and is configured to use the determined current to figure out the temperature of the DUT contacting structure using the thermal model.

6. The apparatus of claim 1, wherein the control device is configured either to measure or to receive a measurement of a current provided by an ATE port coupled to the DUT contacting structure;
wherein the control device is configured to determine a current flowing through one or more capacitors coupled with the ATE port; and
wherein the control device is configured to derive a current flowing through the DUT contacting structure by using the measured current and by using the determined current flowing through the one or more capacitors coupled to the ATE port.

7. The apparatus of claim 1, wherein the control device is configured to figure out the temperature of the DUT contacting structure using at least one of
an environmental temperature,
a wafer temperature,
a die temperature,
a current carrying capability of the DUT contacting structure,
a heat conduction value of the DUT contacting structure,
a heat convections value of the DUT contacting structure, or
a duration.

8. The apparatus of claim 7, wherein at least one of the environmental temperature, the wafer temperature, or the die temperature is at least one of a respective measured temperature or a respective set point temperature.

9. The apparatus of claim 1, wherein the control device is configured to figure out a temporal evolution of the temperature of the DUT contacting structure using the thermal model.

10. The apparatus of claim 1, wherein the control device is configured to figure out the temperature of the DUT contacting structure using a temporal resolution of at most $1/100$ of a thermal time constant of the DUT contacting structure.

11. The apparatus of claim 1, wherein the control device is configured to perform at least one of control or deactivate the signal applied to the DUT contacting structure based on the figured out temperature.

12. The apparatus of claim 11, wherein the control device is configured to deactivate the signal applied to the DUT contacting structure within a time of less or equal than two times a temporal resolution of the control device.

13. The apparatus of claim 1, wherein the signal applied to the DUT contacting structure is at least one of a test-signal or a power supply signal.

14. The apparatus of claim 1, wherein the DUT contacting structure comprises at least one of a probe needle or a conductor of a DUT socket.

15. The apparatus of claim 1, wherein the control device is configured to perform at least one of reduce, switch off, or limit a current applied to the DUT contacting structure in response to a detection that the figured out temperature of the DUT contacting structure exceeds a threshold to prevent damage on the DUT contacting structure.

16. The apparatus of claim 1, wherein the thermal model is configured to determine a heating power that heats the DUT contacting structure by using a product calculation comprising a first factor based on a measured voltage and a second factor based on a measured current.

17. The apparatus of claim 1, wherein the control device is configured to figure out a temperature of a DUT contact which is operable to electrically couple the DUT to the ATE via the DUT contacting structure by using a particular thermal model, and
wherein the control device is configured to influence the signal applied to the DUT contact structure based on the figured out temperature of the DUT contact and based on the figured out temperature of the DUT contact structure.

18. An automated test equipment (ATE), comprising:
a control device operable to figure out a temperature of a device under test (DUT) contacting structure using a thermal model and operable to influence a signal applied to the DUT contacting structure based on the figured out temperature, wherein the DUT contacting structure is operable to electrically couple a device under test (DUT) to the ATE, wherein the figured out temperature comprises at least one of a determined temperature or an estimated temperature;
an ATE resource configured to provide the signal applied to the DUT contacting structure;
a first measurement unit configured to measure a current of the signal applied to the DUT contacting structure; and
a second measurement unit configured to measure a voltage between an ATE-sided end of the DUT contacting structure and a DUT contact of the DUT, wherein:
the control device is configured to influence the ATE resource to influence the signal applied to the DUT contacting structure based on the figured out temperature; and
the first and the second measurement units are configured to provide the respective measurements of the measured voltage and the measured current to the control device to allow for a determination or to allow for an estimation of the temperature of the DUT contacting structure.

19. The ATE of claim 18, wherein the ATE resource further comprises:

an ATE port for providing the signal applied to the DUT contacting structure;

a decoupling capacitor is coupled to the ATE port; and other circuitry elements, wherein the decoupling capacitor is configured to stabilize the signal provided by the ATE port; and wherein the decoupling capacitor is configured to decouple the DUT from noise generated by the other circuitry elements.

20. The ATE of claim 19, wherein the control device is configured to consider an influence of the decoupling capacitor on the signal applied to the DUT contacting structure to figure out the temperature of the DUT contacting structure.

21. The ATE of claim 20, wherein the control device is configured to consider an influence of the decoupling capacitor by using a measurement of the current of the signal applied to the DUT contacting structure and by using at least one of a predetermined information about a target voltage of the DUT, the measurement of the voltage between the ATE-sided end of the DUT contacting structure and the DUT contact of the DUT, or a voltage measurement of the DUT.

22. The ATE of claim 18, further comprising:

a source regulation configured to regulate at least one of a voltage or a current of the signal which is provided to the DUT contacting structure, and wherein the control device is configured to influence the source regulation based on the figured out temperature of the DUT contacting structure.

23. The ATE of claim 18, wherein the ATE is configured to mark a test as failed in response to at least one of a fact that the control device has influenced the signal applied to the DUT contacting structure or a fact that the control device has influenced the signal applied to the DUT contacting structure by more than a predetermined allowable degree.

24. The ATE of claim 18, wherein the ATE is configured to provide a signal which is applied to one or more force DUT contacting structures and, wherein the ATE is configured to receive a sense signal from one or more sense DUT contacting structures, and wherein the ATE is configured to determine a potential difference between an ATE-sided end of one of the force DUT contacting structure and the sense signal, and wherein the ATE is configured to determine the temperature by using the thermal model and by using the determined potential difference.

25. The ATE of claim 18, wherein the thermal model is configured to consider a thermal history.

26. The ATE of claim 18, wherein the thermal model is configured to consider an actual contact resistance at a transition from the DUT contacting structure to a DUT contact which is operable to electrically couple the DUT to the ATE via the DUT contact structure.

27. The ATE of claim 26, wherein the DUT contact comprises at least one of a DUT pin, a DUT pad, or a DUT ball grid array (bga) ball.

28. The ATE of claim 18, wherein the DUT contacting structure comprises at least one of a probe needle or a conductor of a DUT socket.

29. A method comprising:

figuring out a temperature of a device under test (DUT) contacting structure using a thermal model, and influencing a signal applied to the DUT contacting structure based on the figured out temperature, wherein:

the DUT contacting structure is operable to electrically couple a device under test (DUT) to an automated test equipment (ATE), the figured out temperature comprises at least one of a determined temperature or an estimated temperature, the thermal model comprises at least one of a thermal model of the DUT contacting structure, a thermal model of a DUT contact operable to electrically couple the DUT to the ATE via the DUT contacting structure, or a thermal model that jointly models the DUT contacting structure and the DUT contact, the thermal model comprises a model parametrization, wherein the model parametrization is configured to represent a thermal behavior of the DUT contacting structure, the model parametrization is adapted based on at least one of measurements of a current of the signal applied to the DUT contacting structure and measurements of a voltage of the DUT contacting structure, and the model parametrization provides at least one of a thermal behavior of an interface of the DUT contacting structure and the DUT contact or a thermal behavior of the DUT contact with the thermal model to figure out the temperature of the DUT contacting structure.

30. The method of claim 29, wherein a DUT contact is operable to electrically couple the DUT to the ATE via the DUT contacting structure, and wherein the DUT contact comprises at least one of a DUT pin, a DUT pad, or a DUT ball grid array (bga) ball.

31. The method of claim 29, wherein the DUT contacting structure comprises at least one of a probe needle or a conductor of a DUT socket.

32. A method comprising:

providing, with an automated test equipment (ATE) resource, a signal to a device under test (DUT) contacting structure;

figuring out a temperature of the DUT contacting structure using a thermal model;

measuring a current applied to the DUT contacting structure;

measuring a voltage between an ATE-sided end of the DUT contacting structure and a DUT contact of the DUT; and influencing the ATE resource to influence the signal applied to the DUT contacting structure based on the figured out temperature, wherein:

the DUT contacting structure is operable to electrically couple a device under test (DUT) to an automated test equipment (ATE), the figured out temperature comprises at least one of a determined temperature or an estimated temperature, and a determination or estimation of the temperature of the DUT contacting structure is determined or estimated based on the measured voltage and the measured current.

33. The method of claim 32, wherein a DUT contact is operable to electrically couple the DUT to the ATE via the DUT contacting structure, and wherein the DUT contact comprises at least one of a DUT pin, a DUT pad, or a DUT ball grid array (bga) ball.

34. The method of claim 32, wherein the DUT contacting structure comprises at least one of a probe needle or a conductor of a DUT socket.

* * * * *